US010317658B2

(12) United States Patent
Hebiishi et al.

(10) Patent No.: US 10,317,658 B2
(45) Date of Patent: Jun. 11, 2019

(54) MICROSCOPE SYSTEM AND CORRECTION COLLAR OPERATING DEVICE

(71) Applicant: OLYMPUS CORPORATION, Shibuya-ku, Tokyo (JP)

(72) Inventors: Hiroyasu Hebiishi, Hachioji (JP); Masaru Mizunaka, Hino (JP); Shintaro Kobayashi, Hachioji (JP); Akihiro Kitahara, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 912 days.

(21) Appl. No.: 14/789,293

(22) Filed: Jul. 1, 2015

(65) Prior Publication Data

US 2016/0004061 A1    Jan. 7, 2016

(30) Foreign Application Priority Data

Jul. 3, 2014 (JP) .................................. 2014-137782

(51) Int. Cl.
*G02B 21/06* (2006.01)
*G02B 21/00* (2006.01)
*G02B 21/24* (2006.01)

(52) U.S. Cl.
CPC ....... *G02B 21/0088* (2013.01); *G02B 21/242* (2013.01); *G02B 21/248* (2013.01)

(58) Field of Classification Search
CPC .. G02B 21/0088; G02B 21/241; G02B 21/242; G02B 21/248; G02B 21/02; G02B 21/06
(Continued)

(56) References Cited

U.S. PATENT DOCUMENTS 5,867,310 A * 2/1999 Hasegawa ............ G02B 21/248
359/380
8,053,711 B2 11/2011 Fomitchov et al.
(Continued)

FOREIGN PATENT DOCUMENTS

EP    1970746 B1    8/2010
JP    6053916 A    3/1985
(Continued)

OTHER PUBLICATIONS

Japanese Office Action (and English translation thereof) dated Dec. 26, 2017, issued in counterpart Japanese Application No. 2014-137782.

*Primary Examiner* — Stephone B Allen
*Assistant Examiner* — Jyotsna V Dabbi
(74) *Attorney, Agent, or Firm* — Holtz, Holtz & Volek PC

(57) ABSTRACT

A microscope includes: an objective lens having an optical system; a correction collar provided on the objective lens and configured to move the optical system in a direction of an optical axis of the optical system by rotating around the objective lens to correct aberration; a switching unit to which the objective lens is attachable and which switches a position of the objective lens; a supporting unit for supporting the switching unit; and a focusing unit that holds the supporting unit such that the supporting unit is movable along the optical axis of the objective lens. A correction collar operating device is detachably attached to the supporting unit and includes: an input unit for inputting rotary force to rotate the correction collar; and a correction collar driving unit for rotating the correction collar according to the rotary force while the correction collar driving unit has contact with the correction collar.

20 Claims, 10 Drawing Sheets

(58) Field of Classification Search
USPC .......................................... 359/388, 368, 377
See application file for complete search history.

(56) References Cited

U.S. PATENT DOCUMENTS

| | | | |
|---|---|---|---|
| 2002/0036823 A1 | 3/2002 | Shimada et al. | |
| 2002/0080479 A1 | 6/2002 | Nishida et al. | |
| 2005/0024718 A1 | 2/2005 | Sase et al. | |
| 2008/0225416 A1* | 9/2008 | Harada | G02B 21/0088 359/830 |
| 2013/0120833 A1* | 5/2013 | Hirano | G02B 21/06 359/385 |

FOREIGN PATENT DOCUMENTS

| | | | |
|---|---|---|---|
| JP | 2002169101 A | 6/2002 | |
| JP | 2005083514 A | 3/2005 | |
| JP | 2008224992 A | 9/2008 | |
| JP | 2010047415 A | 3/2010 | |
| JP | 2010518448 A | 5/2010 | |
| JP | 2010243838 A | 10/2010 | |
| WO | 2008100695 A3 | 8/2008 | |

* cited by examiner

MICROSCOPE SYSTEM AND CORRECTION COLLAR OPERATING DEVICE

CROSS REFERENCE TO RELATED APPLICATIONS

This application is based upon and claims the benefit of priority from Japanese Patent Application No 2014-137782, filed on Jul. 3, 2014, the entire contents of which are incorporated herein by reference.

BACKGROUND

1. Technical Field

The disclosure relates to a correction collar operating device for operating a correction collar provided on an objective lens, and to a microscope system including the correction collar operating device.

2. Related Art

Microscopes that illuminate a specimen for observation have widely been used to observe a cell or the like, for example, in the field of medical science or biology. Microscopes have been used also for various purposes such as quality control, for example, of metallographic structure, research and development for a new material, and examination of an electronic device or a magnetic head in the field of industries. At least an objective lens configured to collect observation light from the specimen, and a revolver that holds the objective lens and can move up and down in a direction of the optical axis of the objective lens are attached to the microscope.

The side surfaces of some objective lenses are provided with a correction collar configured to correct the aberration (or the spherical aberration) in accordance with the thickness of a slide glass or the culture container where the specimen is placed or stored. The correction collar can rotate around the body of the objective lens in a circumferential direction of the side surface of the objective lens so as to move one or more lenses (or an optical system) provided inside the objective lens in a direction of the optical axis by the rotation.

As a technique to rotate the correction collar, a control device that is provided at the rotary shaft unit (or the central unit) of the revolver or each of the objective lenses and has a function to automatically rotate such a correction collar is disclosed (see, for example, Japanese Translation of PCT International Application Publication No. JP-T-2010-518448).

The control device disclosed in JP-T-2010-518448 is provided at the rotary shaft unit (or the central unit) of the revolver or each of the objective lenses. Thus, the control device can follow the motion of the correction collar provided to the objective lens even when the objective lens (or the revolver) moves up and down in the optical axis. This enables the control device disclosed in JP-T-2010-518448 to rotate the correction collar regardless of the up-and-down motion of the objective lens.

SUMMARY

In accordance with some embodiments, a correction collar operating device and a microscope system including the correction collar operating device are presented.

In some embodiments, a microscope system includes a microscope and a correction collar operating device. The microscope includes: one or more objective lenses each having at least an optical system configured to collect observation light from a specimen; a correction collar provided on each of the one or more objective lenses and configured to move the optical system in a direction of an optical axis of the optical system by rotating around each of the one or more objective lenses to correct aberration; a switching unit to which the one or more objective lenses are attachable and which is configured to switch positions of the one or more objective lenses; a supporting unit for supporting the switching unit; and a focusing unit that holds the supporting unit such that the supporting unit is movable along the optical axis of each of the one or more objective lenses. The correction collar operating device is detachably attached to the supporting unit and includes: an input unit configured to input rotary force to rotate the correction collar; a correction collar driving unit configured to rotate the correction collar in response to the rotary force while the correction collar driving unit has contact with the correction collar; and a transmitting unit configured to transmit the rotary force input by the input unit to the correction collar driving unit.

In some embodiments, a microscope system includes a microscope and a correction collar operating device. The microscope includes: one or more objective lenses each having at least an optical system configured to collect observation light from a specimen; a correction collar provided on each of the one or more objective lenses and configured to move the optical system in a direction of an optical axis of the optical system by rotating around each of the one or more objective lenses to correct aberration; a switching unit to which the one or more objective lenses are attachable and which is configured to switch positions of the one or more objective lenses; a supporting unit for supporting the switching unit; and a focusing unit that holds the supporting unit such that the supporting unit is movable along the optical axis of each of the one or more objective lenses. The correction collar operating device is detachably attached to the microscope and includes: an input unit configured to input rotary force to rotate the correction collar; a correction collar driving unit configured to follow motion of each of the one or more objective lenses while the correction collar driving unit has contact with the correction collar and configured to rotate the correction collar in response to the rotary force while the correction collar driving unit has contact with the correction collar; and a transmitting unit configured to transmit the rotary force input by the input unit to the correction collar driving unit.

In some embodiments, a correction collar operating device is configured to be detachably attached to a microscope. The microscope includes: one or more objective lenses each having at least an optical system configured to collect observation light from a specimen; a correction collar provided on each of the one or more objective lenses and configured to move the optical system in a direction of an optical axis of the optical system by rotating around each of the one or more objective lenses to correct aberration; a switching unit to which the one or more objective lenses are attachable and which is configured to switch positions of the one or more objective lenses; a supporting unit for supporting the switching unit; and a focusing unit that holds the supporting unit such that the supporting unit is movable along the optical axis of each of the one or more objective lenses. The correction collar operating device is configured to be detachably attached to the supporting unit and includes: an input unit configured to input rotary force to rotate the correction collar; a correction collar driving unit configured to rotate the correction collar in response to the rotary force while the correction collar driving unit has contact with the correction collar; and a transmitting unit configured to transmit the rotary force input by the input unit to the correction collar driving unit.

In some embodiments, a correction collar operating device is configured to be detachably attached to a microscope. The microscope includes: one or more objective lenses each having at least an optical system configured to collect observation light from a specimen; a correction collar provided on each of the one or more objective lenses and configured to move the optical system in a direction of an optical axis of the optical system by rotating around each of the one or more objective lenses to correct aberration; a switching unit to which the one or more objective lenses are attachable and which is configured to switch positions of the one or more objective lenses; a supporting unit for supporting the switching unit; and a focusing unit that holds the supporting unit such that the supporting unit is movable along the optical axis of each of the one or more objective lenses. The correction collar operating device includes: an input unit configured to input rotary force to rotate the correction collar; a correction collar driving unit configured to rotate the correction collar in response to the rotary force while the correction collar driving unit has contact with the correction collar; and a transmitting unit configured to transmit the rotary force input by the input unit to the correction collar driving unit. The correction collar driving unit is configured to move in a direction orthogonal to a direction in which a load is applied to the correction collar.

The above and other features, advantages and technical and industrial significance of this invention will be better understood by reading the following detailed description of presently preferred embodiments of the invention, when considered in connection with the accompanying drawings.

DETAILED DESCRIPTION

Embodiments of the present invention will be described in detail with reference to the appended drawings. The present invention is not limited to the embodiment. Each of the drawings referred to in the description is merely a schematic view describing the shapes, sizes and the positional relationships of the components to bring understanding of the contents of the present invention. In other words, the present invention is not limited to the shapes, sizes, and positional relationships exemplified in each of the drawings.

First Embodiment

Figure 1:
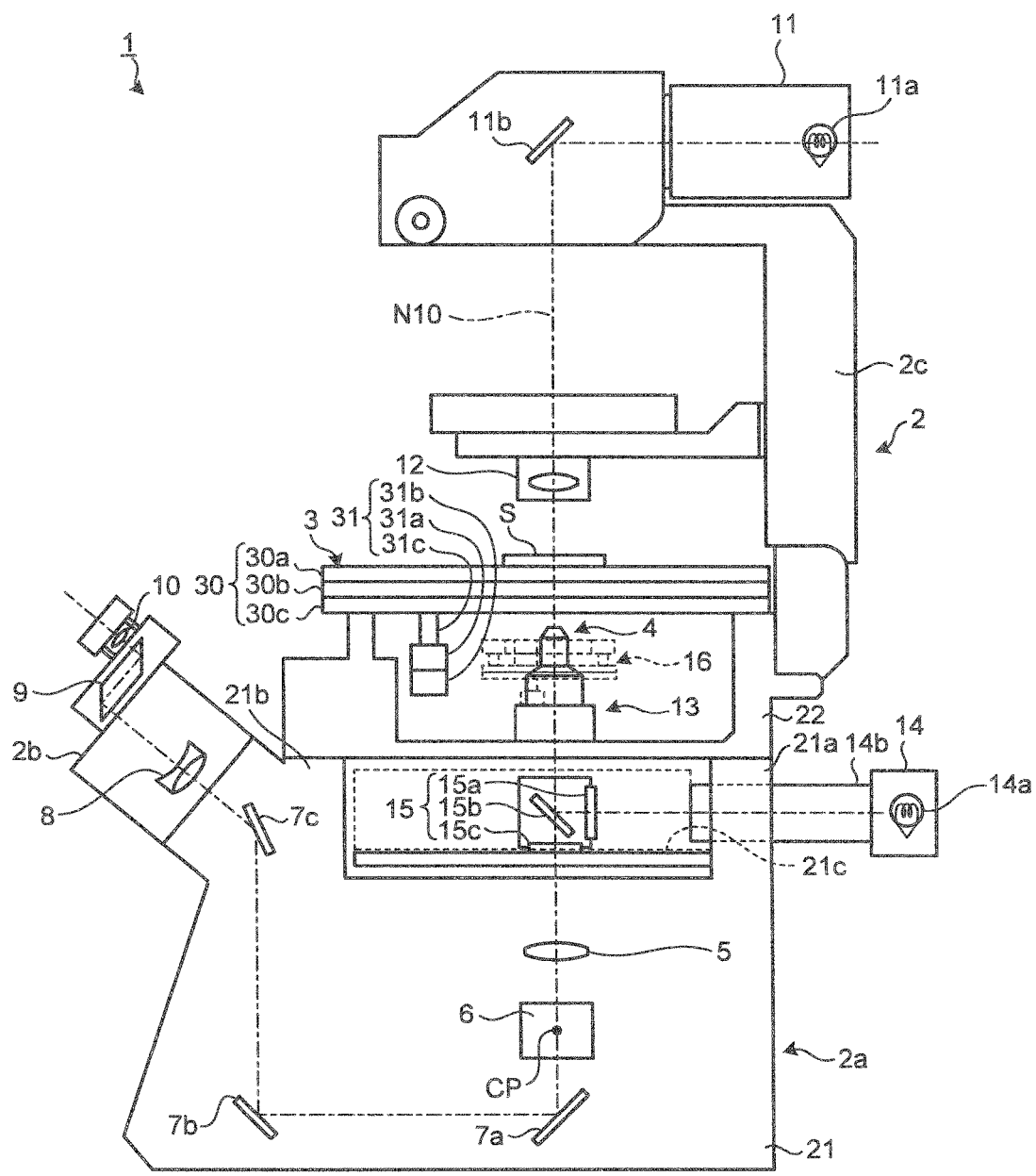
FIG. 1 is a schematic side view of the entire configuration of a microscope system according to a first embodiment of the present invention.
Figure 2:
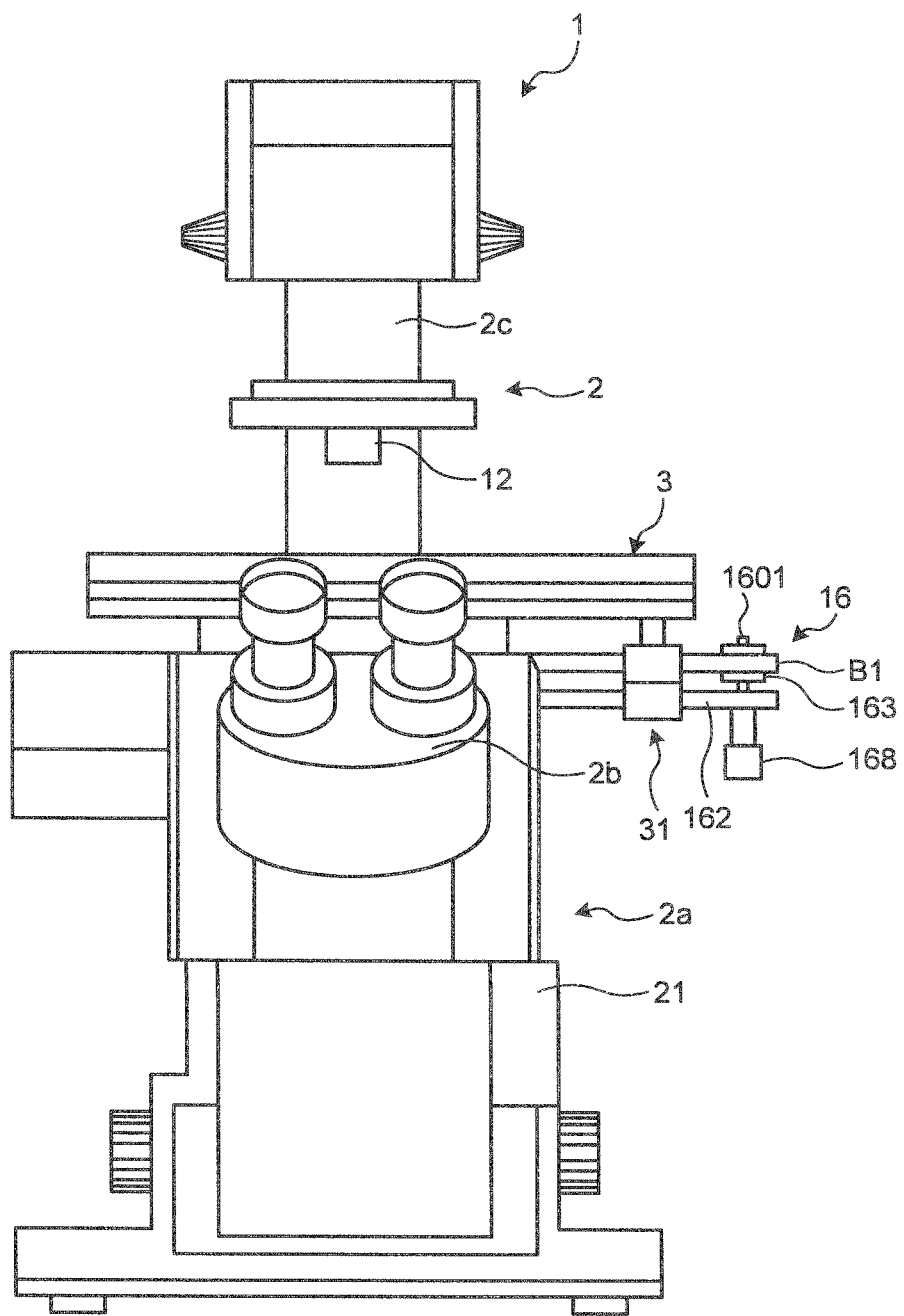
FIG. 2 is a schematic elevation view of the entire configuration of the microscope system according to the first embodiment of the present invention.

First, an inverted microscope system according to a first embodiment of the present invention will be described with reference to the drawings. FIG. 1 is a schematic side view of the entire configuration of a microscope system according to the first embodiment. FIG. 2 is a schematic elevation view of the entire configuration of the microscope system according to the first embodiment. As illustrated in FIGS. 1 and 2, a microscope system 1 is, for example, an inverted microscope configured to form an image with the observation light from a specimen S specifically stained with a fluorescent dye in order to observe the specimen S. The microscope system 1 includes a microscope body 2 including a body unit 2a that works as the foundation of the microscope system 1, a lens-barrel 2b that is detachably provided to the body unit 2a and includes at least an eyepiece, and an arm 2c that extends from the body unit 2a in a direction of a light path N10 of the illumination light with which the specimen S is irradiated. The attachment of a stage 3, an objective lens 4 (or an objective lens holder 13), a lamp housing and the like to the microscope body 2 forms the microscope according to the present invention.

The body unit 2a includes a base 21 that has a concave shape, viewed from the side, with legs 21a and 21b extending in a substantially cylindrical shape, and a holder 22 that has a concave shape, is supported by the legs 21a and 21b, and holds the stage 3 described below. The base 21 may be provided with a control board configured to generally control the microscope system 1. The control board sometimes relays the electric power source from the outside to each of the components or sometimes relays the electric power source from the power unit embedded in the control board to each of the components.

The base 21 includes therein a tube lens 5 configured to form an image with the light collected by the objective lens 4, a light path switching prism 6 configured to transmit the light with which the tube lens 5 forms an image and refract the light in a specified direction, and mirrors 7a, 7b, and 7c configured to reflect the light transmitted though the light path switching prism 6 in a predetermined direction.

The light path switching prism 6 may be replaceable with a plurality of optical members having different transmittances. For example, the base 21 may include an optical member that transmits 50% of the light and reflects 50% of the light (or the light path switching prism 6), an optical member that reflects all of the light with which the tube lens 5 forms an image in a predetermined direction, or an optical member that transmits all of the light with which the tube lens 5 forms an image, and may be replaceably placed on the light path N10. A camera port CP connected, for example, to a CCD camera is provided at a position in a direction in which the light path switching prism 6 reflects the light. The light reflected in a direction orthogonal to the light path N10 with the light path switching prism 6 is introduced to the camera port CP.

The lens-barrel 2b is connected to the body unit 2a such that the observation light of the specimen S is introduced from the base 21 to the lens-barrel 2b. The lens-barrel 2b includes a tube lens 8 configured to form an image with the observation light reflected on the mirror 7c, a prism 9 configured to reflect the observation light with which the tube lens 8 forms an image in a predetermined direction, and an eyepiece 10 configured to collect the light reflected by the prism 9. The eyepiece 10 is a lens used to enlarge and see the formed intermediate image.

The arm 2c is provided with a first lamp housing 11 that includes a light source 11a for emitting transmitted illumination light, and a capacitor 12 supported movably up and down along the light path N10 of the objective lens 4. The first lamp housing 11 is a housing in which the light source 11a implemented, for example, with a halogen lamp is embedded. The first lamp housing 11 is supported by the arm 2c. The light from the first lamp housing 11 is reflected on a mirror 11b toward the specimen S (or the objective lens 4).

The holder 22 holds the stage 3 on which the specimen S is placed at the tips of the holder 22, and additionally holds an objective lens holder 13 at the hollow space of the concave shape. The objective lens holder 13 holds the objective lens 4, which collects the observation light from the specimen S on the stage 3, movably up and down.

A second lamp housing 14 is attached to the base 21. The second lamp housing 14 includes a light source 14a and emits an epi-illumination light. The second lamp housing 14 is a housing in which the light source 14a implemented, for example, with a mercury lamp or a xenon lamp is embedded. The second lamp housing 14 is placed detachably on the base 21 through a floodlight tube 14b. The floodlight tube 14b allows the transmission of the light emitted from the light source 14a in the second lamp housing 14. A laser can also be used instead of the light source 14a.

An internal area 21c is formed with the legs 21a and 21b of the base 21. A mirror unit 15 is attached to the internal area 21c. The mirror unit 15 is configured to switch the light paths of the epi-illumination light from the light source 14a, the light reflected on or emitted from the specimen S, and the light transmitted through the specimen S.

The mirror unit 15 includes an excitation filter 15a, a dichroic mirror 15b, and an absorbing filter 15c. The excitation filter 15a extracts (transmits) the light corresponding to an excitation wavelength from the emitted light emitted from the light source 14a. The dichroic mirror 15b reflects the light of a specified wavelength among the light emitted from the light source 14a, and transmits the light of a specified wavelength among the light emitted from the specimen S. The absorbing filter 15c extracts light of a desired wavelength from the light emitted from the specimen S. A plurality of (for example, eight) mirror units 15 may detachably held in a mirror cassette such that an embedded motor (not illustrated) causes the mirror units 15 to enter or withdraw from the light path of the light emitted from the light source 14a.

The stage 3 includes a placement unit 30 on which the specimen S is configured to be placed and held, and a stage operating unit 31 configured to regulate the position of the specimen S on the placement unit 30. The placement unit 30 includes a first member 30a, a second member 30b, and a third member 30c that have a plate shape and are stacked sequentially. In the placement unit 30, for example, the third member 30c works as the basis (is fixed) such that the stage operating unit 31 moves the first member 30a and the second member 30b on the plate surface of the third member 30c. In such a case, the specimen S is placed on the first member 30a, and the first member 30a and the second member 30b move in directions orthogonal to each other on the planes parallel to the principal plane. An opening portion (not illustrated) including an opening through which the light path N10 passes is formed on each of the first member 30a to the third member 30c when the first member 30a to third member 30c are attached to the body unit 2a. The openings formed on the first member 30a and the second member 30b have a size large enough to include the light path N10 regardless of the motion of the first member 30a and the second member 30b.

The stage operating unit 31 includes input units 31a and 31b that can input the travel distances of the first member 30a and the second member 30b, respectively, and a supporting member 31c that supports the input units 31a and 31b and transmits the travel distances input by the input units 31a and 31b to the first member 30a and the second member 30b, respectively. The input units 31a and 31b according to the first embodiment are implemented, for example, with a rack and pinion, and input the travel distances of the first member 30a and the second member 30b in accordance with the rotation of the input units 31a and 31b, respectively. Alternatively, the first member 30a and the second member 30b may automatically move with an input button provided, for example, on the body unit 2a.

In transmitted-light illumination of the microscope system 1 having the configuration described above, the specimen S is irradiated with the transmitted illumination light from the light source 11*a* through the mirror 11*b*. Subsequently, an intermediate image formed with the observation light passing through the specimen S or formed with the observation light emitted from the specimen S is formed on the observation light path (or the light path N10) with the objective lens 4 and tube lens 5. Then, an image is formed at the position of the eyepiece through the tube lens 8 such that the observer visually observes the image as the image of the specimen formed with the transmitted light. The observation with transmitted light is used, for example, for a bright-field microscopy, a phase-contrast microscopy, or a differential interference contrast microscopy.

In epi-illumination, the epi-illumination light from the light source 14*a* is collimated in the floodlight tube 14*b*. Subsequently, light of a specified wavelength is selected, by the excitation filter 15*a*, from the epi-illumination light. The light of the wavelength selected by the excitation filter 15*a* is reflected on the dichroic mirror 15*b* toward the objective lens 4. When the specimen S is irradiated with the illumination light reflected on the dichroic mirror 15*b* as the epi-illumination light through the objective lens 4, the fluorescent dye or fluorescent protein of the specimen S is excited and emits fluorescence. The objective lens 4 captures the emitted fluorescence as an image. An intermediate image of the specimen S transmitted through the dichroic mirror 15*b* and the absorbing filter 15*c* and placed on the light path N10 is formed on the observation light path by the objective lens 4 and tube lens 5. Then, the image is formed at the position of the eyepiece 10 through the tube lens 8 such that the observer visually observes the image as the image of the specimen formed by the emission, for example, of the fluorescence.

Figure 3:
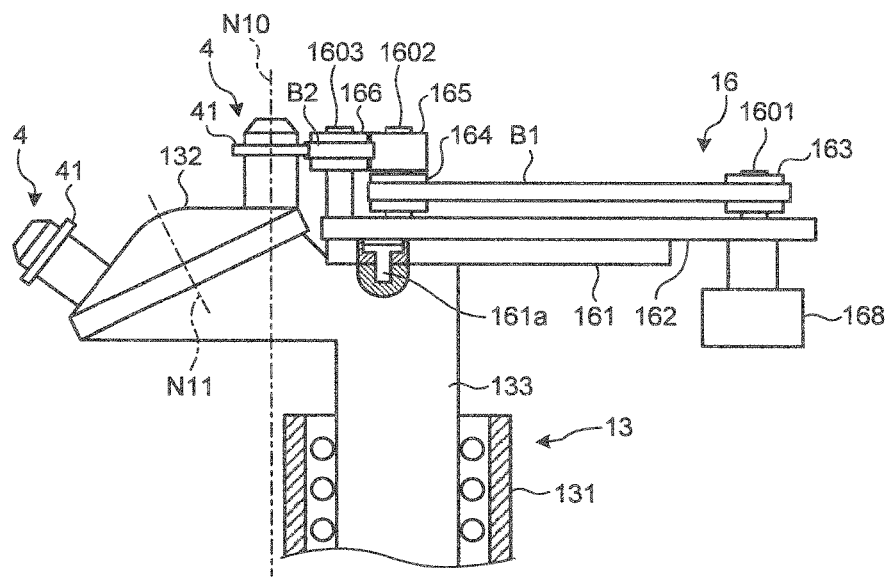
FIG. 3 is a schematic side view of the configuration of the primary components of the microscope system according to the first embodiment of the present invention.
Figure 4:
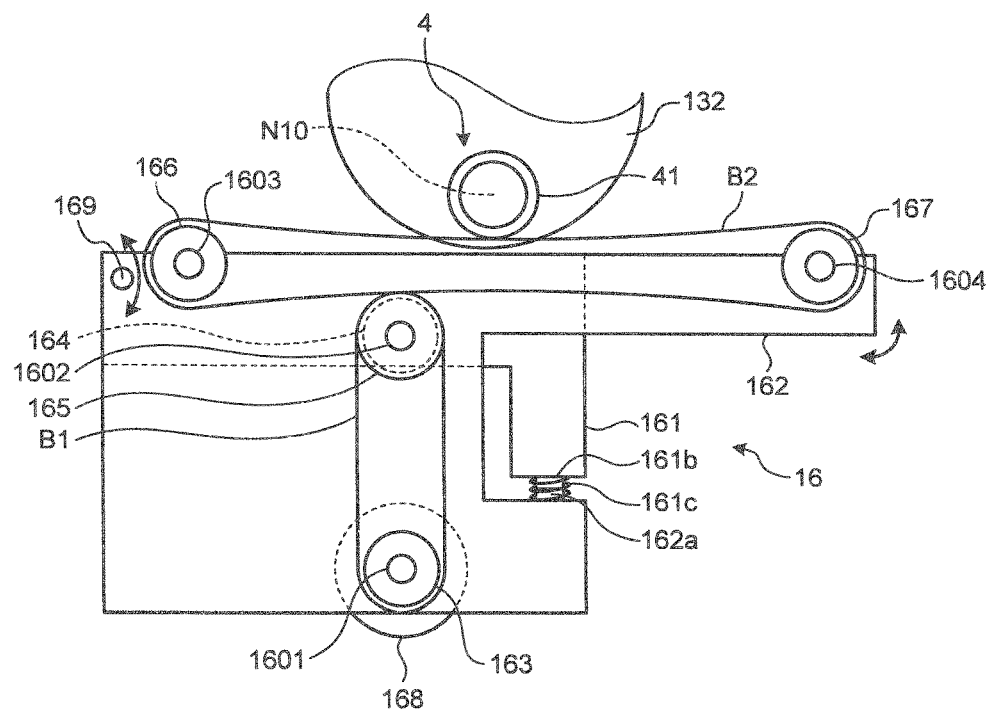
FIG. 4 is a schematic top view of the configuration of the primary components of the microscope system according to the first embodiment of the present invention when a correction collar operating device has contact with a correction collar.

Next, the configuration of the objective lens 4 and the correction collar operating device provided near the objective lens 4 will be described with reference to the drawings. FIG. 3 is a schematic side view (partially including cross-sectional surfaces) of the configuration of the primary components of the microscope system according to the first embodiment. FIG. 4 is a schematic top view of the configuration of the primary components of the microscope system according to the first embodiment when the correction collar operating device has contact with the correction collar.

The objective lens 4 includes therein one or a plurality of lenses (or an optical system). A correction collar 41 is provided on the side surface of the objective lens 4. The correction collar 41 is rotatable around the body of the objective lens 4 in a circumferential direction of the side surface of the objective lens such that the rotation moves the optical system provided in the objective lens 4 in a direction of the optical axis. The operation of the correction collar 41 corrects the aberration (or the spherical aberration) in accordance with the thickness of the slide glass or culture container where the specimen S is placed or stored. The outer periphery of the correction collar 41 is, for example, knurled with a knurling process to increase the resistance.

The objective lens holder 13 includes: a focusing unit 131 fixed on the holder 22; a revolver 132 (or a switching unit) to which one or a plurality of objective lenses 4 is attached such that the rotation of the revolver 132 (the rotation around a rotary shaft N11) places (switches) one of the objective lenses 4 on the light path N10; and a revolver holder 133 (or a supporting unit) of which first end is held on the focusing unit 131 moveably up and down along the optical axis of the objective lens 4 (or the light path N10), and of which second end supports the revolver 132. The focusing unit 131 is implemented, for example, with a linear guide and a ball screw, and has a function to move the revolver holder 133 up and down.

A correction collar operating device 16 configured to rotate the correction collar 41 is detachably attached to the revolver holder 133. The correction collar operating device 16, as a unit, includes: a base 161; a rotary unit 162 rotatably supported on the base 161; a plurality of pulleys attached to the rotary unit 162 and including a first driving pulley 163, a first driven pulley 164, a second driving pulley 165, a second driven pulley 166, and a third driven pulley 167; rotary shafts 1601 to 1604 configured to support the pulleys such that the pulleys are rotatable; and an operating unit 168 (or an input unit) configured to input the rotary force to the first driving pulley 163.

Figure 5:
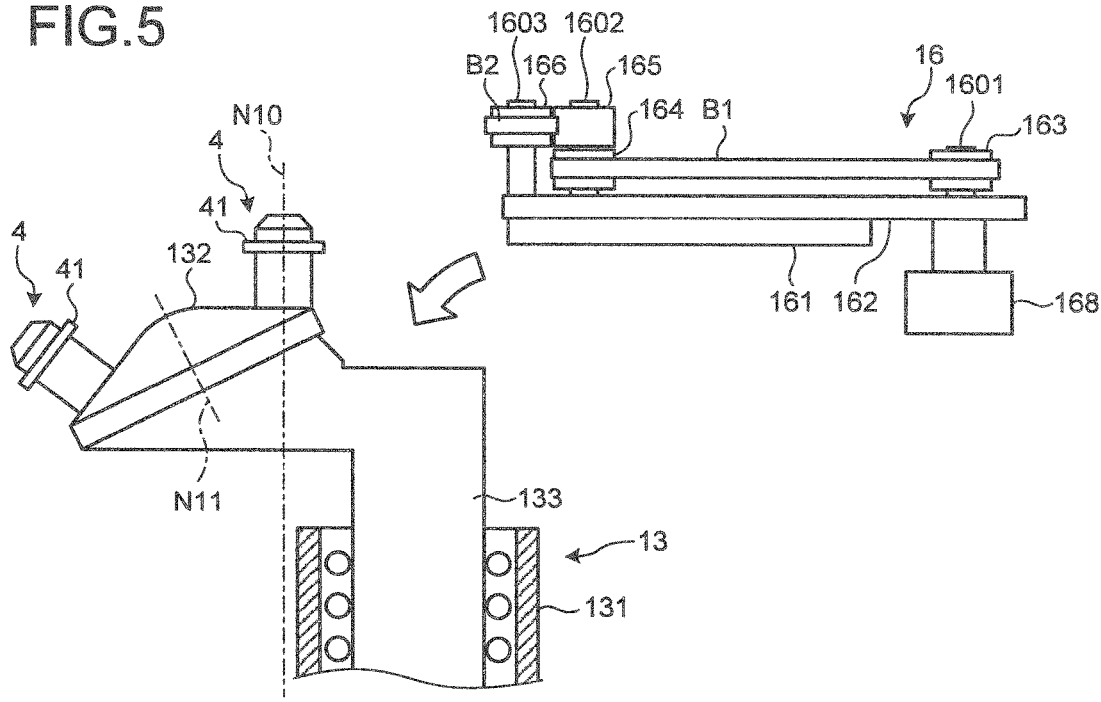
FIG. 5 is a schematic side view of the configuration of the primary components of the microscope system according to the first embodiment of the present invention when a revolver separates from the correction collar operating device.

FIG. 5 is a schematic side view of the configuration of the primary components of the microscope system according to the first embodiment when the revolver separates from the correction collar operating device. The base 161 has a flat plate shape, and is attached to the revolver holder 133 of an existing microscope system without the correction collar operating device 16 (see FIG. 5) with a fixing member 161*a* (see FIG. 3). The fixing member 161*a* is implemented, for example, with a publicly known fixing unit such as a screw. The rotary unit 162 has a flat plate shape, and is rotatably provided around a rotary shaft 169 extending from the base 161. In other words, the rotary unit 162 is provided to the base 161 so as to be rotatable on the principal plane of the base 161.

The first driving pulley 163 is attached to a first end of the rotary shaft 1601 so as to rotate around the rotary shaft 1601. The operating unit 168 is rotatably supported on the rotary unit 162 and is connected to a second end of the rotary shaft 1601 so as to rotate around the rotary shaft 1601. In other words, the first driving pulley 163 and the operating unit 168 are provided on the opposite sides of the rotary unit 162. The rotary shaft 1601 is implemented, for example, with a bearing and is supported by the operating unit 168 so as to be rotatable around the central shaft of the rotary shaft 1601 as the rotary shaft in synchronization with the rotation of the operating unit 168. As a result, the rotation of the operating unit 168 rotates the rotary shaft 1601 and thus rotates the first driving pulley 163.

The first driven pulley 164 is attached to a rotary shaft 1602 different from the rotary shaft 1601 of the first driving pulley 163 so as to rotate around the rotary shaft 1602. The rotary shaft 1602 is implemented, for example, with a bearing and is supported with the rotary unit 162 so as to be rotatable around the central shaft of the rotary shaft 1602 as the rotary shaft in synchronization with the rotation of the first driven pulley 164. The first driving pulley 163 and the first driven pulley 164 are connected to each other through a first driving belt B1. This connection rotates the first driven pulley 164 around the rotary shaft 1602 in accordance with the rotation of the first driving pulley 163.

The second driving pulley 165 is attached to the first driven pulley 164 on the side opposite side to the rotary unit 162 of the rotary shaft 1602 so as to rotate around the rotary shaft 1602 in synchronization with the rotation of the first driven pulley 164.

The second driven pulley 166 is attached to the rotary shaft 1603 so as to rotate around the rotary shaft 1603. The third driven pulley 167 is attached to the rotary shaft 1604 so as to rotate around the rotary shaft 1604. The rotary shafts 1603 and 1604 are implemented, for example, with a bearing and are supported on the rotary unit 162. The second driven pulley 166 and the third driven pulley 167 are connected to each other through a second driving belt B2. The outer periphery of the second driving belt B2 has contact (meshes) also with the second driving pulley 165 such that the rotary force of the second driving pulley 165 is transmitted to the second driving belt B2. The second driving belt B2 orbits in response to the transmitted rotary force when the rotary force is transmitted from the second driving pulley 165. The second driving belt B2 is made of an elastic and deformable material, such as rubber or resin, that warps in response to an external load.

When the correction collar operating device 16 is fixed on the revolver holder 133, the correction collar operating device 16 is placed at a position in which the second driving belt B2 can abut against the correction collar 41 of the objective lens 4 placed on the light path N10. In the first embodiment, the second driving pulley 165, the second driven pulley 166, the third driven pulley 167, and the second driving belt B2 constitute the correction collar driving unit according to the present invention. The first driving pulley 163, the first driven pulley 164, and the first driving belt B1 constitute the transmitting unit according to the present invention.

In the correction collar operating device 16, the rotation of the operating unit 168 rotates the first driving pulley 163 and then the force by the rotation is transmitted to the first driving belt B1 and rotates the first driven pulley 164. The rotation of the first driven pulley 164 rotates the second driving pulley 165 on the same axis, and then the rotation causes the second driving belt B2 contact with the second driving pulley 165 to orbit. It is preferable in such a case that the rotation (or the angle of rotation) of the operating unit 168 is large in comparison to the rotation of the second driving pulley 165 (in other words, the gear ratio of the operating unit 168 is larger than the gear ratio of the second driving pulley 165) in order to finely adjust the correction collar 41. It is also preferable as illustrated in FIG. 2 that the operating unit 168 is placed at a position in which the operating unit 168 protrudes from the right or left side of the body unit 2a, viewed from the front side of the eyepiece 10 in order to improve the operability when the user manually rotates the operating unit 168. It is also preferable that the rotary shafts 1601 to 1604 are parallel to the optical axis of the objective lens 4 placed on the light path N10 when the correction collar operating device 16 is fixed on the revolver holder 133. Especially, placing the rotary shafts 1603 and 1604 parallel to the optical axis of the objective lens 4 placed on the light path N10 causes the second driving belt B2 to press and have contact with the correction collar 41, and add the load to the correction collar 41 in a direction orthogonal to the plane parallel to the optical axis. This load can further stabilize the pressure and contact of the second driving belt B2 on the correction collar 41.

Figure 6:
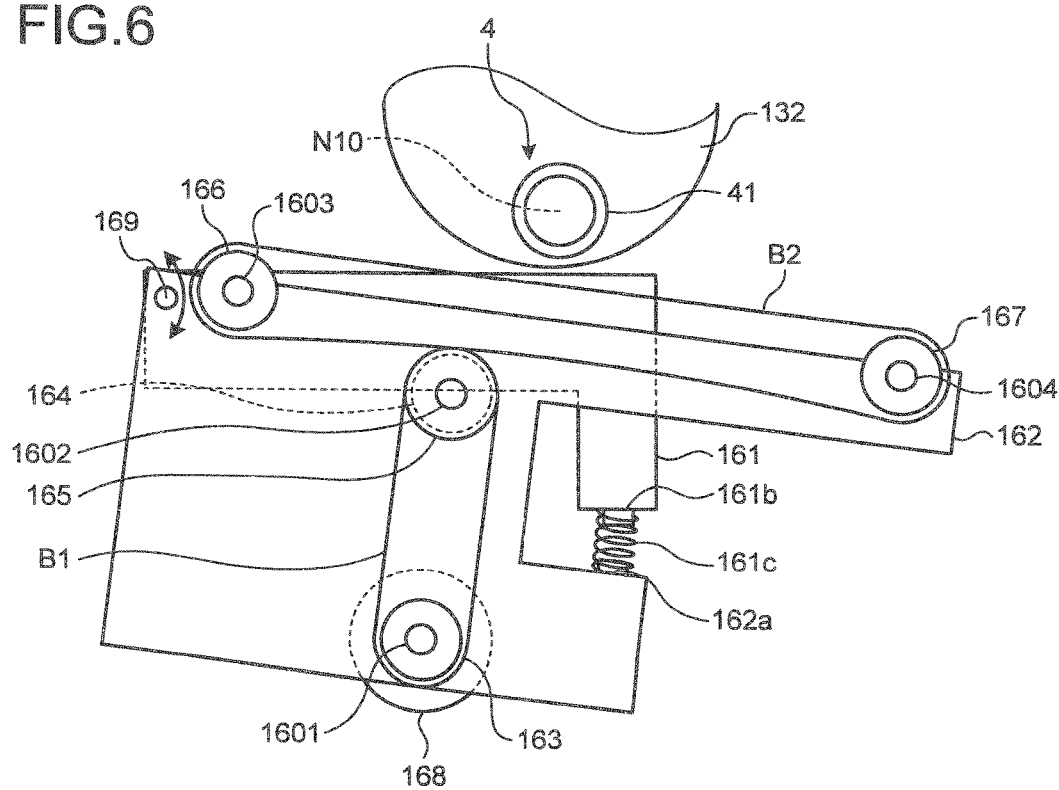
FIG. 6 is a schematic top view of the configuration of the primary components of the microscope system according to the first embodiment of the present invention when the correction collar operating device does not have contact with the correction collar.

FIG. 6 is a schematic top view of the configuration of the primary components of the microscope system according to the first embodiment when the correction collar operating device does not have contact with the correction collar. The base 161 is provided with a magnet 161b, and a coil spring 161c formed by a wound wiring material and extendable in the axis direction around which the wiring material is wound. The rotary unit 162 is provided with a magnet 162a. The magnets 161b and 162a are placed at the positions from which the rotation of the rotary unit 162 can bring the magnets 161b and 162a into contact with each other, and the magnets 161b and 162a are fixed to each other by applying pressure by the magnetic force of the magnets 161b and 162a that attract each other. The magnets 161b and 162a constitute a positioning unit according to the present invention. The fixation of the magnets 161b and 162a by applying pressure determines the relative positions of the base 161 and the rotary unit 162.

The coil spring 161c is placed so as to store the magnets 161b and 162a therein, and add load to the rotary unit 162 in a direction in which the magnet 161b and magnet 162a separate from each other. Thus, when the action of the magnets 161b and 162a is not applied, the coil spring 161c moves the base 161 and the rotary unit 162 in a direction in which the base 161 and the rotary unit 162 separate from each other (in other words, the rotary unit 162 rotates). The coil spring 161c may be attached to the base 161, may be attached to the rotary unit 162, or may be attached to both of the base 161 and the rotary unit 162. The coil spring 161c may be attached to either of the base 161 and the rotary unit 162 as long as the base 161 and the rotary unit 162 can move in a direction in which the base 161 and the rotary unit 162 separate from each other.

When the rotation of the rotary unit 162 on the base 161 brings the second driving belt B2 of the correction collar operating device 16 into contact with the correction collar 41, the magnets 161b and 162a are fixed to each other by applying pressure. The fixation of the magnets 161b and 162a by applying pressure fixes the rotary unit 162 to the base 161 and maintains the contact by pressure (or the mesh) of the second driving belt B2 and the correction collar 41. The operation of the operating unit 168 while the second driving belt B2 and the correction collar 41 have contact with each other can rotate the correction collar 41 through the second driving belt B2.

On the other hand, when the rotation of the rotary unit 162 on the base 161 separates the second driving belt B2 of the correction collar operating device 16 from the correction collar 41, the magnets 161b and 162a do not have contact with each other (separate from each other). At that time, the load applied by the coil spring 161c maintains the separation of the base 161 from the rotary unit 162. As described above, the rotation of the rotary unit 162 on the base 161 can switch the contact and separation between the second driving belt B2 and the correction collar 41.

Hereinafter, the operation of the correction collar operating device 16 and the placement of the objective lens 4 will be described. First, the rotary unit 162 of the correction collar operating device 16 rotates in a direction in which the magnets 161b and 162a separate from each other such that the second driving belt B2 does not make contact with the correction collar 41. Subsequently, the revolver 132 rotates such that a desired objective lens 4 is placed on the light path N10. After the desired objective lens 4 is placed on the light path N10, the rotary unit 162 rotates so as to fix the magnets 161b and 162a to each other by applying pressure. The fixation brings the second driving belt B2 into contact with the correction collar 41. As described above, bringing the second driving belt B2 into contact with the correction collar 41 after the placement of the objective lens 4 can rotate the revolver 132 and place a desired objective lens 4 without the contact between the correction collar 41 and the second driving belt B2.

The second driving belt B2 is supported by the second driven pulley 166 and the third driven pulley 167 while the second driving belt B2 is elastic and deformable (can warp and deform). This can bring the second driving belt B2 into contact with the correction collar 41 by applying pressure regardless of the variations in diameter of the correction collar 41 even if the diameter varies depending on the type of the objective lens 4. It is preferable that the second driving belt B2 is placed at a position in which the maximum load is applied to the correction collar 41 on a plane passing through the light path N10 and the rotary shaft N11, and the direction in which the maximum load is applied is orthogonal to the light path N10 in order to efficiently add the force of the second driving belt B2 to the correction collar 41. The placement and tension of the second driving belt B2 can be adjusted by the arrangement of the second driven pulley 166 and the third driven pulley 167.

The correction collar operating device 16 is fixed to the revolver holder 133 that holds the revolver 132 and is movable up and down. Thus, when the objective lens 4 moves in the optical axis direction, the correction collar operating device 16 follows the objective lens 4 and moves in the optical axis direction. In other words, the entire correction collar operating device 16 can move up and down along the optical axis of the objective lens 4 (or the light path N10). This can prevent an unnecessary rotation of the correction collar 41 caused by an accidental separation between the correction collar 41 and the second driving belt B2, or a variation in positional relationship between the correction collar 41 and the second driving belt B2 due to the motion of the objective lens 4.

According to the first embodiment, the correction collar operating device 16 is fixed to the revolver holder 133 such that the operation of the operating unit 168 rotates the correction collar 41 through the first driving pulley 163, the first driven pulley 164, the second driving pulley 165, the first driving belt B1, and the second driving belt B2. This can ensure the operation of the correction collar 41 regardless of the up-and-down motion of the objective lens 4 (or the correction collar 41).

According to the first embodiment, the band-shaped second driving belt B2 has contact with the correction collar 41. Thus, the width of the second driving belt B2 can be adjusted in accordance with the height of the correction collar 41 that is to be brought into contact with the second driving belt B2. Even when the height of the correction collar 41 varies depending on the type of the objective lens 4, regulating the width of the second driving belt B2 such that the width includes a range in which the height of the correction collar 41 can vary allows the operation of the correction collar without replacing the correction collar operating device 16 or the second driving belt B2 in accordance with the objective lens 4. Even when the diameter of the correction collar 41 varies depending on the type of the objective lens 4, the correction collar can be operated without replacement of the correction collar operating device 16 or the second driving belt B2 in accordance with the objective lens 4. This is because the second driving belt B2 is elastic and deformable and warps in response to an external load.

According to the first embodiment, the second driving belt B2 is elastic and deformable and warps in response to an external load. Thus, even when the operating unit 168 is operated beyond the range in which the correction collar 41 rotates, the second driving belt B2 warps and idles on the correction collar 41, and this can prevent the rotary force from being input to the correction collar 41 that is beyond the range in which the correction collar 41 rotates.

According to the first embodiment, the rotation of the rotary unit 162 can release the contact between the correction collar 41 and the second driving belt B2. This can prevent the second driving belt B2 from unnecessarily making contact with the correction collar 41 when it is not necessary to operate the correction collar 41, and thus can prevent the correction collar 41 from accidentally rotating by incorrect operation.

According to the first embodiment, the direction in which the operating unit 168 rotates is identical to the direction in which the correction collar 41 rotates. This enables the user to easily operate the operating unit 168 with the user's perception.

According to the first embodiment, the increase in rotation of the operating unit 168 in comparison with the rotation of the correction collar 41 (or the travel distance of the second driving belt B2) can make it possible to adjust the rotation of the correction collar 41 with a high degree of accuracy.

According to the first embodiment, the operating unit 168 is placed at a position far away from the objective lens 4 and a position at which the operating unit 168 does not contact with the stage 3 and the microscope body 2. This can improve the operability when the user manually rotates the operating unit 168. In the first embodiment, for example, changing the arrangement of the rotary shafts can adjust the distance from the operating unit 168 to the correction collar 41 (or the light path N10).

According to the first embodiment, the second driving belt B2 is elastic and deformable and warps in response to an external load. Thus, if the revolver 132 rotates while the correction collar 41 has contact with the second driving belt B2, the warp of the second driving belt B2 prevents the second driving belt B2 from hindering the motion of the objective lens 4. Thus, when the revolver 132 rotates while the correction collar 41 has contact with the second driving belt B2, for example, the damage on the second driving belt B2 or the correction collar 41 can be prevented.

According to the first embodiment, the correction collar operating device 16 is formed as a unit that is detachably attached to the revolver holder 133 with the fixing member 161a. This makes the correction collar operating device 16 detachable to an existing microscope system without largely changing the existing microscope system. Thus, the user can add the correction collar operating device 16 to the microscope system as necessary.

First Modified Example of First Embodiment

Figure 7:
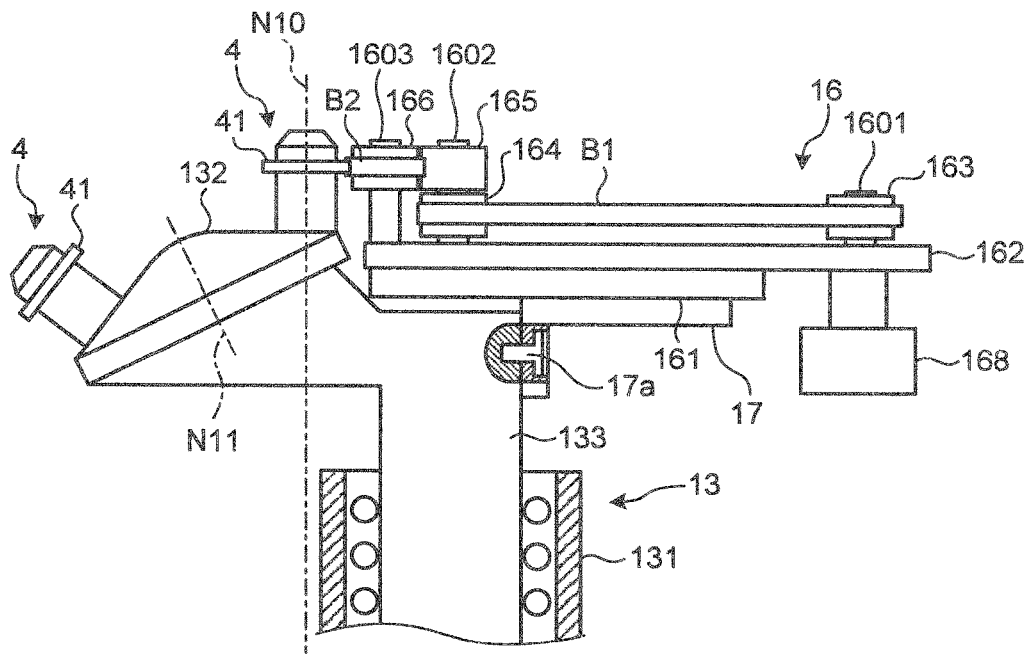
FIG. 7 is a schematic side view of the configuration of the primary components of a microscope system according to a first modified example of the first embodiment of the present invention.

FIG. 7 is a schematic side view (partially including cross-sectional surfaces) of the configuration of the primary components of the microscope system according to the first modified example of the first embodiment. When it is difficult to directly attach a correction collar operating device 16 to a revolver holder 133 as described in the first embodiment, the correction collar operating device 16 may be attached to the revolver holder 133 through another member as described in the first modified example.

In the first modified example illustrated in FIG. 7, the correction collar operating device 16 is attached to the revolver holder 133 through an attachment member 17. The attachment member 17 has an approximate L shape, viewed from the side surface. A first end of the attachment member 17 is attached to the revolver holder 133 through a screw 17a while a second end of the attachment member 17 supports the correction collar operating device 16. The correction collar operating device 16 and the attachment member 17 are fixed to each other with a publicly known fixing unit such as a screw or an adhesive. The correction collar operating device 16 may be attached to the revolver holder 133 with the attachment member 17 as described above even when it is difficult to directly attach the correction collar operating device 16 to the revolver holder 133. Not only when it is difficult to attach the correction collar operating device 16 to the revolver holder 133 but also when the height at which the correction collar operating device 16 is attached is adjusted, the attachment member 17 may be used.

Second Modified Example of First Embodiment

Figure 8:
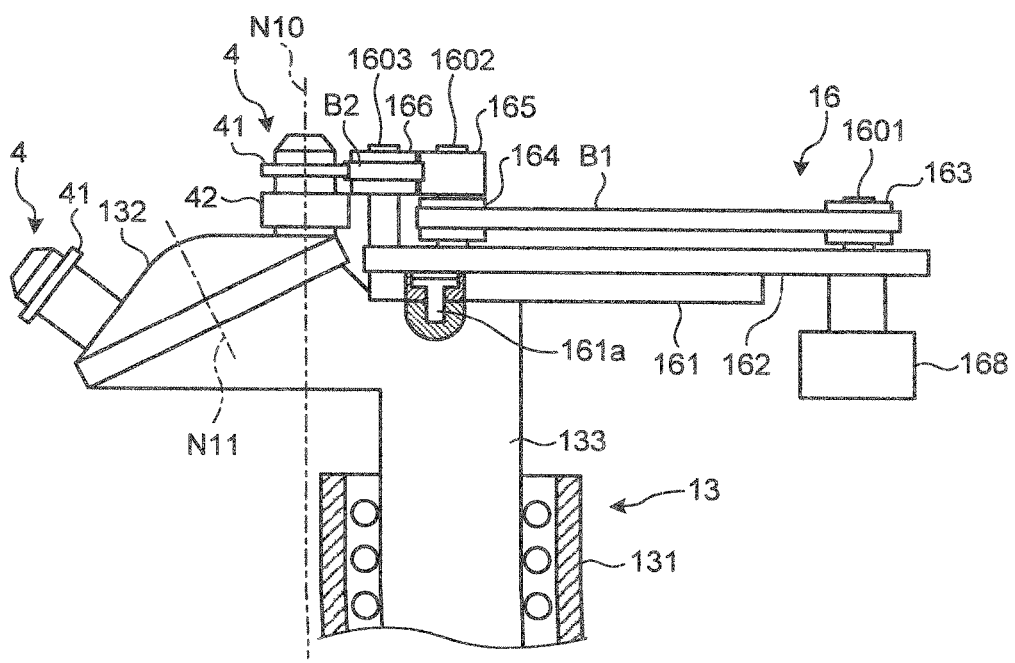
FIG. 8 is a schematic side view of the configuration of the primary components of a microscope system according to a second modified example of the first embodiment of the present invention.

FIG. 8 is a schematic side view (partially including cross-sectional surfaces) of the configuration of the primary components of the microscope system according to the second modified example of the first embodiment. Adjusting the height at which a second driving belt B2 is attached in a correction collar operating device 16 as described above can form a hollow space between the correction collar 41 and the revolver 132. In the second modified example, a heater 42 configured to warm the objective lens 4 is provided in the hollow space.

The heater 42 has, for example, a sheet shape and covers a side surface of the objective lens 4. The heater 42 generates heat under control by a controller (not illustrated). This can stabilize the temperature of the objective lens 4. In addition to the heater 42 configured to warm the objective lens 4, a cooling member configured to cool the objective lens 4 may be provided.

Third Modified Example of First Embodiment

Figure 9:
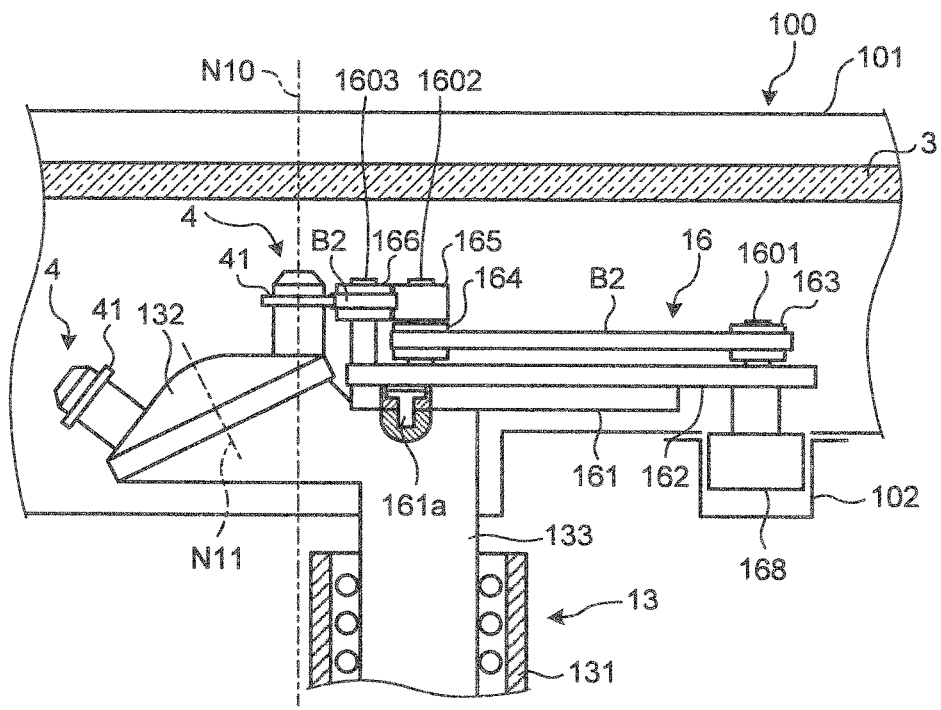
FIG. 9 is a schematic side view of the configuration of the primary components of a microscope system according to a third modified example of the first embodiment of the present invention.

FIG. 9 is a schematic side view (partially including cross-sectional surfaces) of the configuration of the primary components of the microscope system according to the third modified example of the first embodiment. A microscope system 1 described above further can include a thermal insulating box 100 housing a stage 3, an objective lens 4 (or a revolver 132), and a correction collar operating device 16, and configured to maintain the temperature of the inside of the thermal insulating box 100 at a constant temperature.

The thermal insulating box 100 maintains the internal temperature at a predetermined temperature under control by a controller (not illustrated). The thermal insulating box 100 includes: a housing unit 101 that houses the stage 3, the objective lens 4 (or the revolver 132), and the correction collar operating device 16, and exposes the operating unit 168 to the outside; and a lid 102 that houses the operating unit 168 exposed from the housing unit 101 to the outside, and seals the housing unit 101. The lid 102 may be removed from the housing unit 101 to operate the operating unit 168. The lid 102 may be attached to the housing unit 101 to maintain the internal temperature of the thermal insulating box 100 at a predetermined temperature.

Fourth Modified Example of First Embodiment

Figure 10:
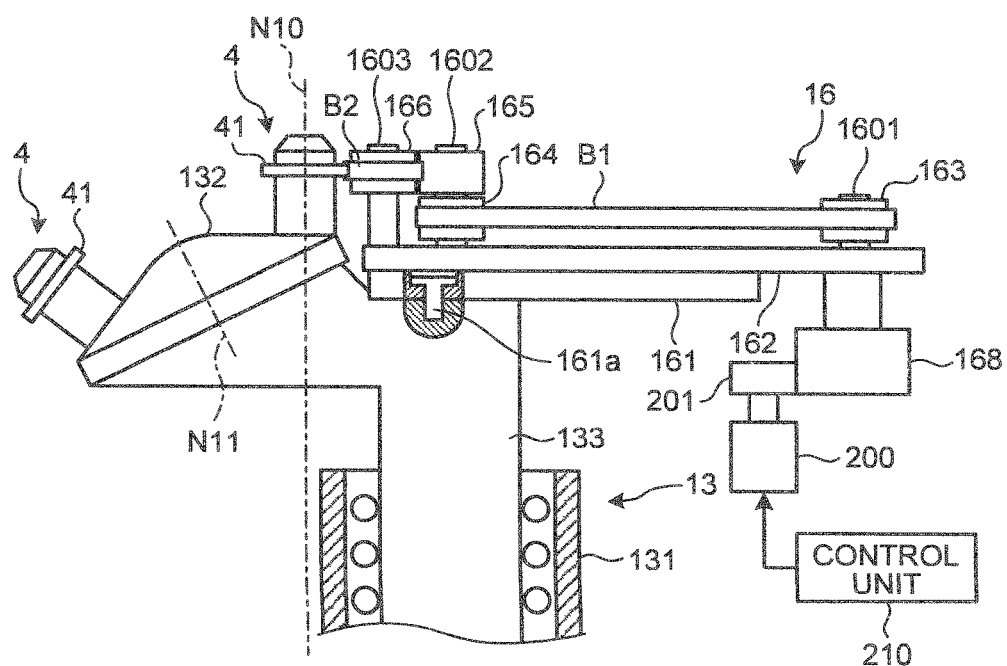
FIG. 10 is a schematic side view of the configuration of the primary components of a microscope system according to a fourth modified example of the first embodiment of the present invention.

FIG. 10 is a schematic side view (partially including cross-sectional surfaces) of the configuration of the primary components of the microscope system according to the fourth modified example of the first embodiment. In the first embodiment, the user's manual operation of the operating unit 168 causes the second driving belt B2 to orbit and thus rotates the correction collar 41. In the fourth modified example, by driving a motor, the operating unit 168 is electrically operated.

In the fourth modified example, a microscope system 1 further includes a driving motor 200 configured to generate rotary force, and a driving gear 201 attached to the driving motor 200 and configured to transmit the rotary force of the driving motor 200 to the operating unit 168 by meshing with the operating unit 168. The driving motor 200 rotates the driving gear 201 under control by a control unit 210. The control unit 210 may drive the driving motor 200 in accordance with an instruction signal input by the user, or may drive the driving motor 200 by executing, for example, a predetermined program. The driving gear 201 may directly rotate a first driving pulley 163 instead of rotating the operating unit 168.

Second Embodiment

Figure 11:
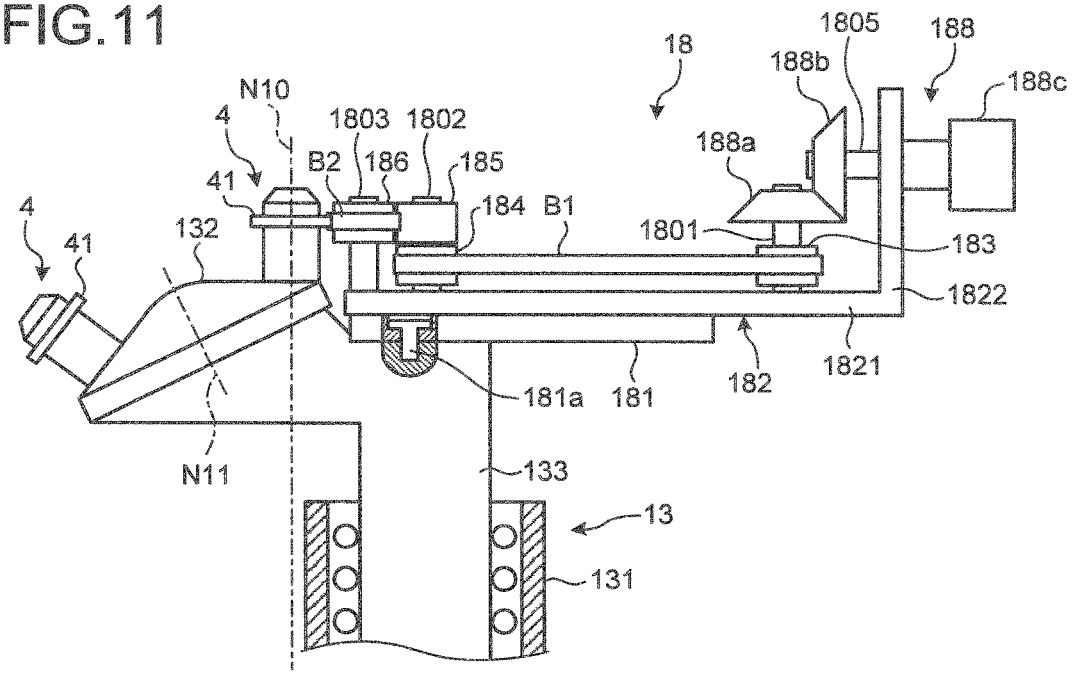
FIG. 11 is a schematic side view of the configuration of the primary components of a microscope system according to a second embodiment of the present invention.
Figure 12:
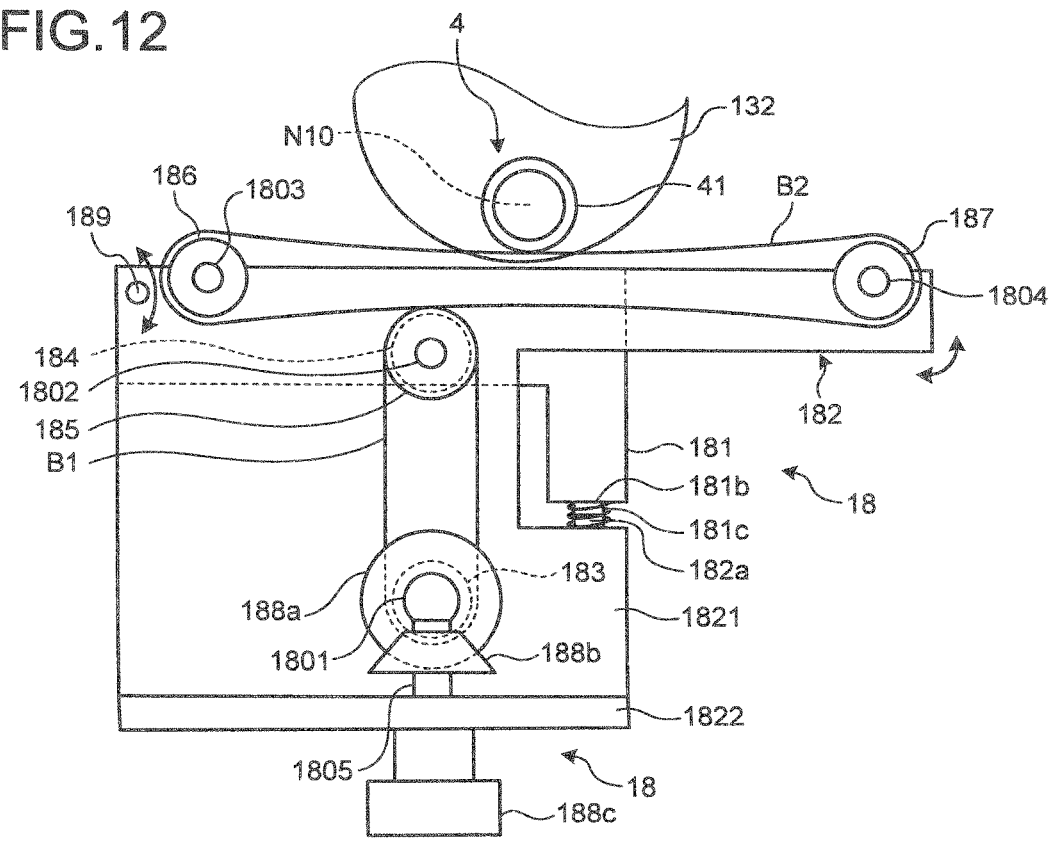
FIG. 12 is a schematic top view of the configuration of the primary components of the microscope system according to the second embodiment of the present invention when a correction collar operating device has contact with a correction collar.

FIG. 11 is a schematic side view (partially including cross-sectional surfaces) of the configuration of the primary components of the microscope system according to a second embodiment. FIG. 12 is a schematic top view of the configuration of the primary components of the microscope system according to the second embodiment when the correction collar operating device has contact with the correction collar. The same reference signs are used to designate the same elements as those in FIG. 1 and the like. In the first embodiment, the operating unit 168 is provided under the rotary unit 162 and rotates around the shaft parallel to the optical axis of the objective lens 4 (or the light path N10). However, in the second embodiment, an operating unit is provided on a side of the rotary unit, and rotates around the shaft orthogonal to the optical axis of the objective lens 4 (or the light path N10).

In the second embodiment, a correction collar operating device 18 configured to rotate the correction collar 41 is detachably attached to a revolver holder 133. The correction collar operating device 18 includes: a base 181; a rotary unit 182 rotatably supported on the base 181; a plurality of pulleys including a first driving pulley 183, a first driven pulley 184, a second driving pulley 185, a second driven pulley 186, and a third driven pulley 187 that are attached to the rotary unit 182; rotary shafts 1801 to 1804 configured to support the pulleys such that the pulleys are rotatable, respectively; and an operating mechanism 188 (or an input unit) configured to input rotary force to the first driving pulley 183. The base 181, the first driving pulley 183, the first driven pulley 184, the second driving pulley 185, the second driven pulley 186, and the third driven pulley 187 have the same configurations as those of the base 161, the first driving pulley 163, the first driven pulley 164, the second driving pulley 165, the second driven pulley 166, and the third driven pulley 167, respectively.

The rotary unit 182 is formed by a flat-plate-shaped first member 1821 and a flat-plate-shaped second member 1822 of which principal surface is orthogonal to the principal surface of the first member 1821, and has an approximate L shape, viewed from the side surface. In the rotary unit 182, the first member 1821 supports the first driving pulley 183, the first driven pulley 184, the second driving pulley 185, the second driven pulley 186, and the third driven pulley 187 through the rotary shafts 1801 to 1804, respectively, and the second member 1822 supports the operating mechanism 188 through a rotary shaft 1805.

The first driving pulley 183 is attached to the base of the rotary shaft 1801 so as to rotate around the rotary shaft 1801. The rotary shaft 1801 is implemented, for example, with a bearing and supported by the rotary unit 182 so as to rotate around its own central shaft as the rotary shaft with the rotation of the first driving pulley 183.

The first driven pulley 184 is attached to the rotary shaft 1802 different from the rotary shaft 1801 of the first driving pulley 183 so as to rotate around the rotary shaft 1802. The rotary shaft 1802 is implemented, for example, with a bearing and supported by the rotary unit 182 so as to rotate around its own central shaft with the rotation of the first driven pulley 184. The first driving pulley 183 and the first driven pulley 184 are connected to each other through a first driving belt B1.

The second driving pulley 185 is attached to the rotary shaft 1802 so as to rotate around the rotary shaft 1802 in synchronization with the rotation of the first driven pulley 184.

The second driven pulley 186 is attached to the rotary shaft 1803 so as to rotate around the rotary shaft 1803. The third driven pulley 187 is attached to the rotary shaft 1804 so as to rotate around the rotary shaft 1804. Each of the rotary shafts 1803 and 1804 is implemented, for example, with a bearing and supported by the rotary unit 182. The second driven pulley 186 and the third driven pulley 187 are connected to each other through a second driving belt B2. The outer periphery of the second driving belt B2 has contact also with (meshes with) the second driving pulley 185 such that the rotary force of the second driving pulley 185 is transmitted to the second driving belt B2. When the rotary force of the second driving pulley 185 is transmitted to the second driving belt B2, the second driving belt B2 orbits in response to the transmitted rotary force. In the second embodiment, the second driving pulley 185, the second driven pulley 186, the third driven pulley 187, and the second driving belt B2 constitute the correction collar driving unit according to the present invention. The first driving pulley 183, the first driven pulley 184, and the first driving belt B1 constitute the transmitting unit according to the present invention.

The base 181 is attached to the revolver holder 133 with a fixing member 181a. The rotary unit 182 is rotatably provided around a rotary shaft 189 extending from the base 181. The base 181 and the rotary unit 182 can maintain the contact between the correction collar 41 and the second driving belt B2, using the fixation of magnets 181b and 182a by pressure. A load in a direction in which the base 181 and the rotary unit 182 separate from each other is applied between the base 181 and the rotary unit 182 by a coil spring 181c.

The operating mechanism 188 includes a first bevel gear 188a, a second bevel gear 188b, and an operating unit 188c. The first bevel gear 188a is attached to a first end of the rotary shaft 1801 and can rotate around the rotary shaft 1801. The second bevel gear 188b meshes with the first bevel gear 188a, is attached to a first end of the rotary shaft 1805 approximately orthogonal to the rotary shaft 1801, and can rotate around the rotary shaft 1805. The operating unit 188c is rotatably supported by the second member 1822, and is connected to a second end of the rotary shaft 1805 so as to input the rotary force of the second bevel gear 188b. In the operating mechanism 188, rotating the operating unit 188c rotates the second bevel gear 188b. This rotates the first bevel gear 188a meshing with the second bevel gear 188b. The rotation of the first bevel gear 188a rotates the first driving pulley 183. This enables the second driving belt B2 to orbit as described above.

In this case, it is preferable similarly to the first embodiment that the rotation (or the rotation angle) of the operating unit 188c is larger in comparison with the rotation of the second driving pulley 185 (in other words, the gear ratio of the operating unit 188c is larger than the gear ratio of the second driving pulley 185) in order to finely adjust the correction collar 41. Furthermore, it is preferable that the rotary shafts 1801 to 1804 are placed parallel to the optical axis of the objective lens 4 placed on light path N10 when the correction collar operating device 18 is fixed on the revolver holder 133.

According to the second embodiment, the correction collar operating device 18 is fixed on the revolver holder 133 such that operating the operating unit 188c rotates the correction collar 41 through the first driving pulley 183, the first driven pulley 184, the second driving pulley 185, the first driving belt B1, and the second driving belt B2. This can ensure the operation of the correction collar 41 regardless of the up-and-down motion of the objective lens 4 (or the correction collar 41).

According to the second embodiment, the operating unit 188c rotates around a shaft orthogonal to the optical axis of the objective lens 4 (or the light path N10). Thus, the operating unit 188c can be operated from below the rotary unit 162 as described in the first embodiment, and additionally from the side of the rotary unit 182. Thus, the correction collar operating device 18 (or the correction collar 41) can be operated regardless of, for example, the size of the base 21.

Third Embodiment

Figure 13:
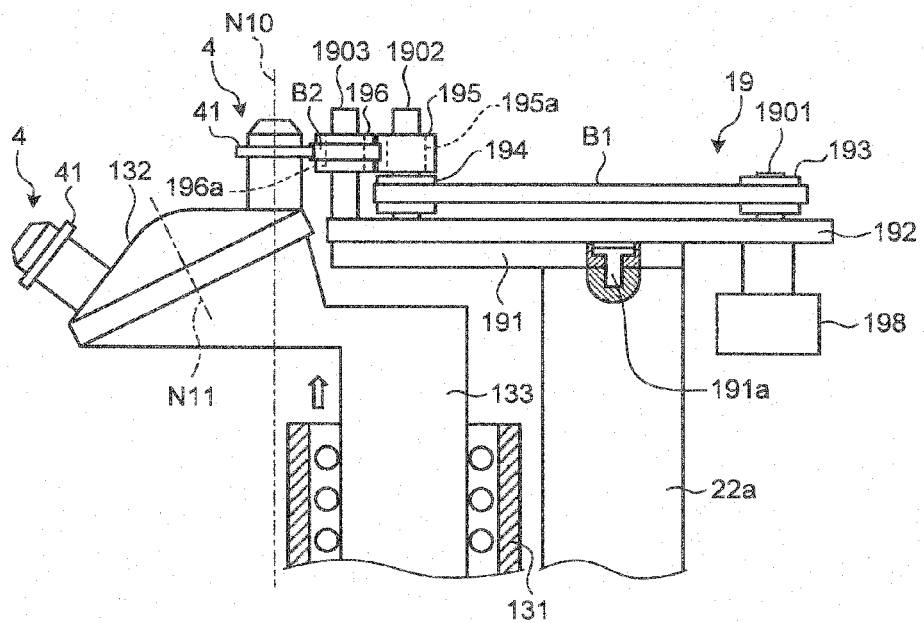
FIG. 13 is a schematic side view of the configuration of the primary components of a microscope system according to a third embodiment of the present invention.
Figure 14:
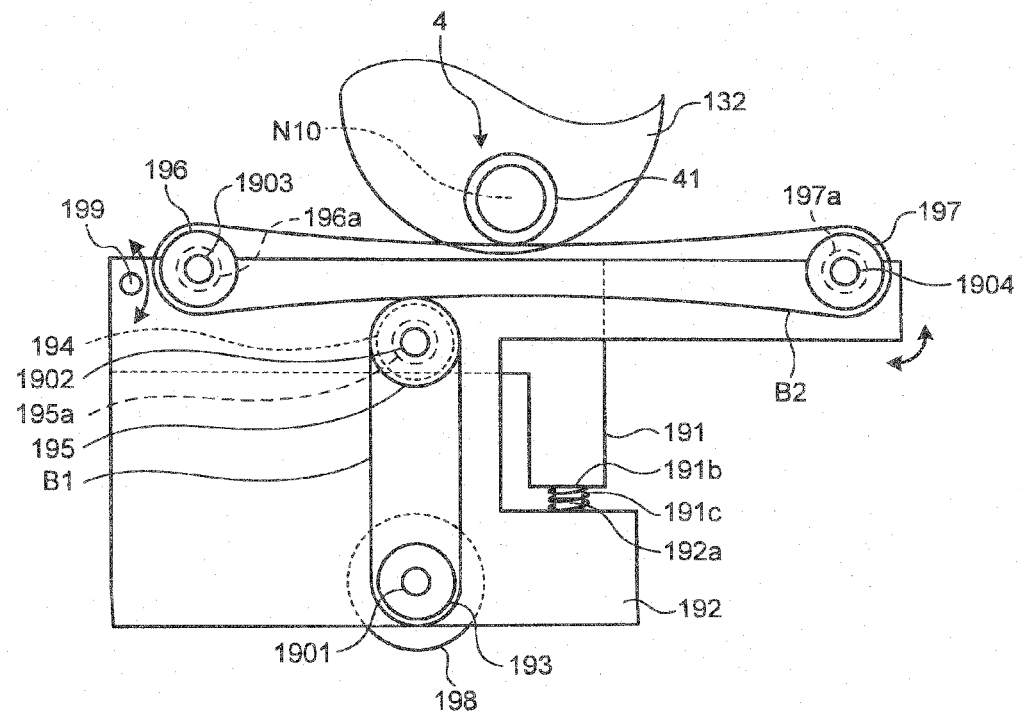
FIG. 14 is a schematic top view of the configuration of the primary components of the microscope system according to the third embodiment of the present invention when a correction collar operating device has contact with a correction collar.
Figure 15:
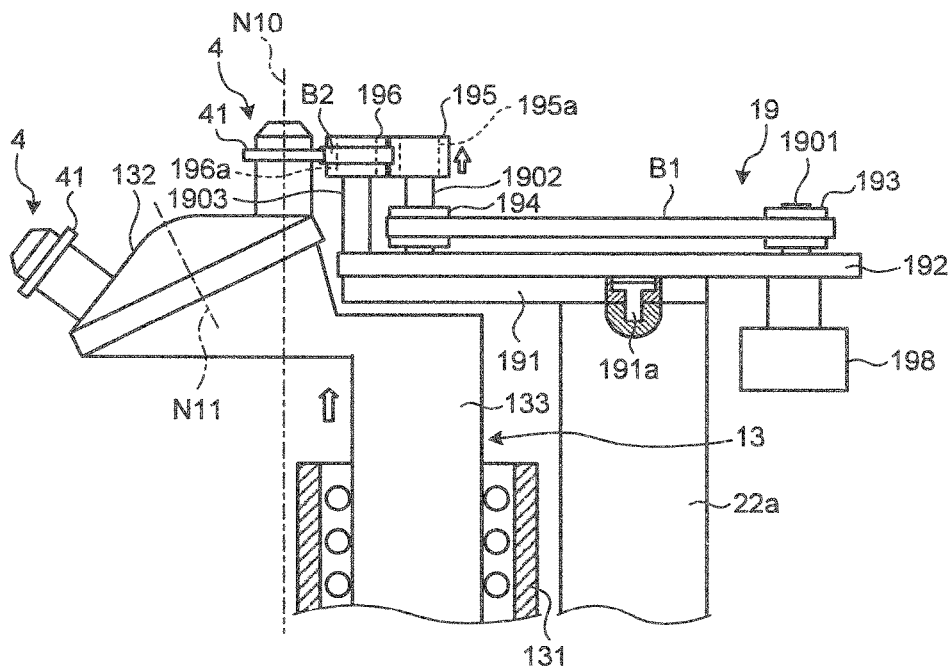
FIG. 15 is a schematic side view of the configuration of the primary components of the microscope system according to the third embodiment when the revolver holder illustrated in FIG. 11 moves upward.

FIG. 13 is a schematic side view (partially including cross-sectional surfaces) of the configuration of the primary components of the microscope system according to a third embodiment of the present invention. FIG. 14 is a schematic top view of the configuration of the primary components of the microscope system according to the third embodiment when the correction collar operating device has contact with the correction collar. The same reference signs are used to designate the same elements as those in FIG. 1 and the like. In the first and second embodiments, each of the correction collar operating devices 16 and 18 is supported by the revolver holder 133 such that the correction collar operating devices can move up and down integrally with the objective lens 4. However, a correction collar operating device 19 according to the third embodiment is attached to a place different from the revolver holder 133 such that a second driving belt B2 moves up and down following a correction collar 41.

The correction collar operating device 19 is supported by a supporting member 22a provided in a hollow space formed in a holder 22. The supporting member 22a is provided as a separate body from the revolver holder 133 and fixed to the holder 22.

The correction collar operating device 19 includes: a base 191; a rotary unit 192 rotatably supported on the base 191; a plurality of pulleys including a first driving pulley 193, a first driven pulley 194, a second driving pulley 195, a second driven pulley 196, a third driven pulley 197 that are attached to the rotary unit 192; rotary shafts 1901 to 1904 configured to support the pulleys, respectively, such that the pulleys are rotatable; and an operating unit 198 configured to input rotary force to the first driving pulley 193.

The first driving pulley 193 is attached to a first end of the rotary shaft 1901 so as to rotate around the rotary shaft 1901. The operating unit 198 is rotatably supported by the rotary unit 192, and is connected to a second end of the rotary shaft 1901 so as to rotate around the rotary shaft 1901. The rotary shaft 1901 is implemented, for example, with a bearing, and is supported by the operating unit 198. The rotary shaft 1901 can rotate around its own central shaft with the rotation of the operating unit 198.

The first driven pulley 194 is attached to the rotary shaft 1902 so as to rotate around the rotary shaft 1902. The rotary shaft 1902 is implemented, for example, with a bearing, and is supported by the rotary unit 192 so as rotate around its own central shaft with the rotation of the first driven pulley

194. The first driving pulley 193 and the first driven pulley 194 are connected to each other through a first driving belt B1. Thus, the first driven pulley 194 rotates around the rotary shaft 1902 in accordance with the rotation of the first driving pulley 193.

The second driving pulley 195 is attached to the first driven pulley 194 on a side different from the rotary unit 192 of the rotary shaft 1902 so as to rotate around the rotary shaft 1902 in synchronization with the rotation of the first driven pulley 194.

The second driven pulley 196 is attached to the rotary shaft 1903 so as to rotate around the rotary shaft 1903. The third driven pulley 197 is attached to the rotary shaft 1904 so as to rotate around the rotary shaft 1904. Each of the rotary shafts 1903 and 1904 is implemented, for example, with a bearing and supported by the rotary unit 192. The second driven pulley 196 and the third driven pulley 197 are connected to each other through the second driving belt B2. The outer periphery of the second driving belt B2 has contact also with the second driving pulley 195 such that the rotary force of the second driving pulley 195 is transmitted to the second driving belt B2. When the rotary force of the second driving pulley 195 is transmitted to the second driving belt B2, the second driving belt B2 orbits in response to the transmitted rotary force. In the third embodiment, the second driving pulley 195, the second driven pulley 196, the third driven pulley 197, and the second driving belt B2 constitute the correction collar driving unit according to the present invention. The first driving pulley 193, the first driven pulley 194, and the first driving belt B1 constitute the transmitting unit according to the present invention.

In the third embodiment, the second driving belt B2 is made of a material having a predetermined frictional force between the second driving pulley 195 and the correction collar 41 in a direction in which the revolver holder 133 moves (or on the light path N10), or the second driving belt B2 has a shape in which the second driving belt B2 has a predetermined frictional force.

The base 191 is attached to a supporting member 22a with a fixing member 191a. The rotary unit 192 is rotatably provided around a rotary shaft 199 extending from the base 191. The base 191 and the rotary unit 192 can maintain the contact between the correction collar 41 and the second driving belt B2, using the fixation of a magnet 191b and a magnet 192a by pressure. A load in which the base 191 and the rotary unit 192 separate from each other is applied between the base 191 and the rotary unit 192 by a coil spring 191c.

The second driving pulley 195 is provided with a linear bushing 195a between the second driving pulley 195 and the rotary shaft 1902. The second driven pulley 196 is provided with a linear bushing 196a between the second driven pulley 196 and the rotary shaft 1903. The third driven pulley 197 is provided with a linear bushing 197a between the third driven pulley 197 and the rotary shaft 1904. Thus, the second driving pulley 195, the second driven pulley 196, and the third driven pulley 197 can move up and down along the rotary shafts (the rotary shafts 1902 to 1904), respectively. When the correction collar operating device 19 is fixed to the supporting member 22a, at least the rotary shafts 1902 to 1904 are parallel to the optical axis of the objective lens 4 placed on the light path N10. In the third embodiment, the correction collar driving unit and a part of the transmitting unit follow the correction collar 41, and can move up and down.

Thus, when the revolver holder 133 moves up and down while the correction collar 41 has contact with the second driving belt B2, the frictional force between the correction collar 41 and the second driving belt B2 causes the second driving belt B2 to follow the motion of the correction collar 41 (or the objective lens 4) and move. FIG. 13 is a schematic side view (partially including cross-sectional surfaces) of the configuration of the primary components of the microscope system according to the third embodiment when the revolver holder 133 illustrated in FIG. 11 moves upward. At that time, the linear bushings 195a, 196a, and 197a move the second driving pulley 195, the second driven pulley 196, and the third driven pulley 197 along the rotary shafts 1902, 1903, and 1904, respectively.

This enables the second driving belt B2 to follow the motion of the correction collar 41 and move, and the correction collar operating device 19 to maintain the function even when the correction collar operating device 19 is attached to a member that is placed at a place different from the revolver holder 133 and does not move up and down.

According to the third embodiment, the correction collar operating device 19 is fixed to the supporting member 22a different from the revolver holder 133, and the operation of the operating unit 198 rotates the correction collar 41 through the first driving pulley 193, the first driven pulley 194, the second driving pulley 195, the first driving belt B1, and the second driving belt B2. Meanwhile, the linear bushings 195a, 196a and 197a can move the second driving pulley 195, the second driven pulley 196, and the third driven pulley 197 up and down along their own rotary shafts, respectively. This ensures the operation of the correction collar 41 regardless of the up-and-down motion of the objective lens 4 (or the correction collar 41).

Fourth Embodiment

Figure 16:
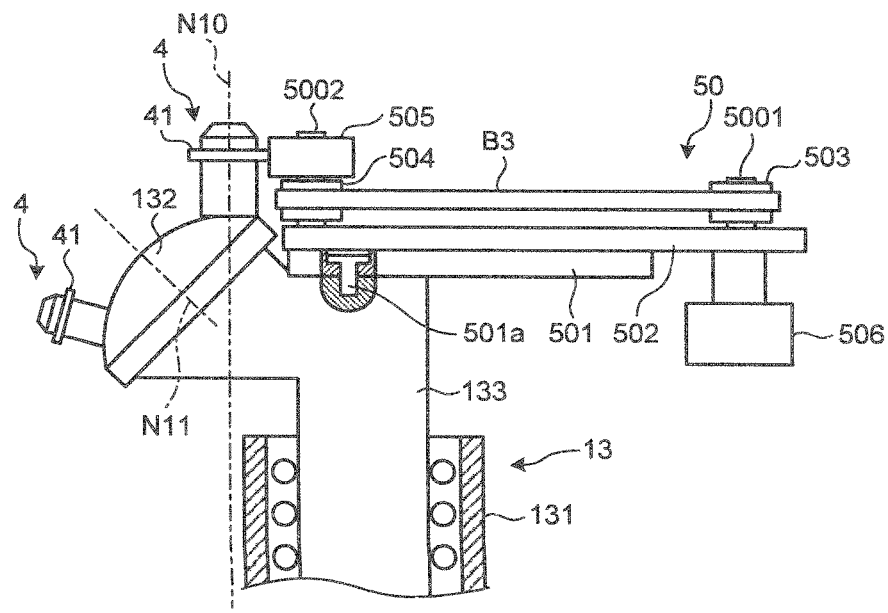
FIG. 16 is a schematic side view of the configuration of the primary components of a microscope system according to a fourth embodiment of the present invention.
Figure 17:
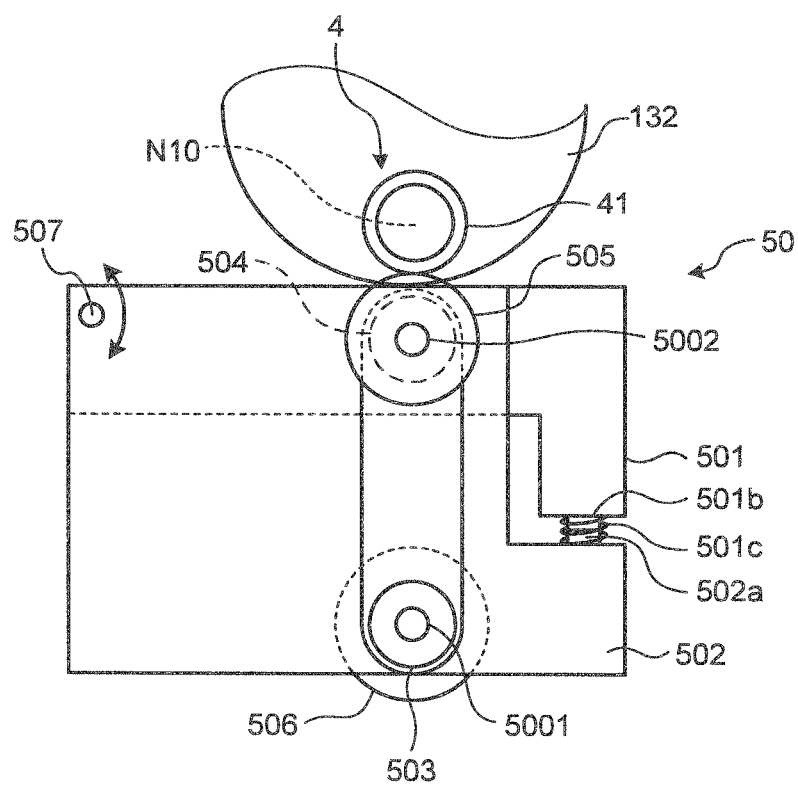
FIG. 17 is a schematic top view of the configuration of the primary components of the microscope system according to the fourth embodiment of the present invention when a correction collar operating device has contact with a correction collar.

FIG. 16 is a schematic side view (partially including cross-sectional surfaces) of the configuration of the primary components of the microscope system according to a fourth embodiment of the present invention. FIG. 17 is a schematic top view of the configuration of the primary components of the microscope system according to the fourth embodiment when the correction collar operating device has contact with the correction collar. The same reference signs are used to designate the same elements as those in FIG. 1 and the like.

A correction collar operating device 50 according to the fourth embodiment includes: a base 501; a rotary unit 502 rotatably supported on the base 501; a plurality of pulleys including a first driving pulley 503, a driven pulley 504, and a second driving pulley 505 that are attached to the rotary unit 502; rotary shafts 5001 and 5002 configured to support the pulleys such that the pulleys are rotatable; and an operating unit 506 configured to input rotary force to the first driving pulley 503.

The base 501 has a flat plate shape and is attached to a revolver holder 133 with a fixing member 501a. The rotary unit 502 has a flat plate shape and is rotatably provided around a rotary shaft 507 extending from the base 501.

The first driving pulley 503 is attached to a first end of the rotary shaft 5001 so as to rotate around the rotary shaft 5001. The operating unit 506 is rotatably supported by the rotary unit 502, and is connected to a second end of the rotary shaft 5001 so as to rotate around the rotary shaft 5001. In other words, the first driving pulley 503 and the operating unit 506 are provided on the opposite sides of the rotary unit 502. The rotary shaft 5001 is implemented, for example, with a bearing, and is supported by the operating unit 506 so as to rotate around its own central shaft as the rotary shaft in synchronization with the rotation of the operating unit 506.

The driven pulley 504 is attached to a rotary shaft 5002 different from the rotary shaft 5001 of the first driving pulley 503 so as to rotate around the rotary shaft 5002. The rotary shaft 5002 is implemented, for example, a bearing, and is supported by the rotary unit 502 so as to rotate around its own central shaft as the rotary shaft in synchronization with the rotation of driven pulley 504. The first driving pulley 503 and the driven pulley 504 are connected to each other through a driving belt B3. Thus, the driven pulley 504 rotates around the rotary shaft 5002 in accordance with the rotation of the first driving pulley 503. In the fourth embodiment, the first driving pulley 503, the first driven pulley 504, and the driving belt B3 constitute the transmitting unit according to the present invention.

The second driving pulley 505 is attached to the driven pulley 504 on a side different from the rotary unit 502 of the rotary shaft 5002 so as to rotate around the rotary shaft 5002 in synchronization with the rotation of the driven pulley 504. The second driving pulley 505 can abut against (mesh with) the correction collar 41, and transmits its own rotary force to the correction collar 41. In the fourth embodiment, the second driving pulley 505 constitutes the correction collar driving unit according to the present invention.

The base 501 and the rotary unit 502 can maintain the contact between the correction collar 41 and the second driving pulley 505, using the attachment of a magnet 501b and a magnet 502a. A load in a direction in which the correction collar 41 and the second driving pulley 505 separate from each other is applied between the base 501 and the rotary unit 502 by the biasing force of a coil spring 501c.

In the correction collar operating device 50, rotating the operating unit 506 rotates the first driving pulley 503. The force by the rotation is transmitted to the driven pulley 504 through the driving belt B3 such that the driven pulley 504 rotates. The rotation of the driven pulley 504 rotates the second driving pulley 505. The rotation can rotate the correction collar 41. It is preferable in such a case that the rotation (or the angle of rotation) of the operating unit 506 is large in comparison to the rotation of the second driving pulley 505 (in other words, the gear ratio of the operating unit 506 is larger than the gear ratio of the second driving pulley 505) in order to finely adjust the correction collar 41. Furthermore, it is preferable that the rotary shafts 5001 and 5002 are parallel to the optical axis of the objective lens 4 placed on the light path N10 when the correction collar operating device 50 is fixed on the revolver holder 133.

According to the fourth embodiment, the correction collar operating device 50 is fixed to the revolver holder 133, and the operation of the operating unit 506 rotates the correction collar 41 through the first driving pulley 503, the driven pulley 504, the driving belt B3, and the second driving pulley 505. This ensures the operation of the correction collar 41 regardless of the up-and-down motion of the objective lens 4 (or the correction collar 41).

In the fourth embodiment, the second driving pulley 505 is provided with a guide bushing so as to work as a correction collar driving unit, and moves up and down along the rotary shaft 5002. This enables the second driving pulley 505 having contact with the correction collar 41 to follow the up-and-down motion of the objective lens 4 even when the correction collar operating device 50 is attached to the supporting member 22a as described in the third embodiment.

The number of units is small according to the fourth embodiment in comparison with the number of units in each of the first to third embodiments, and this can rotate the correction collar 41 with a simple configuration.

Although the magnets are used to position the base and the rotary unit in the first to fourth embodiments and the modified examples, a publicly known means such as a click mechanism may be used to position the base and the rotary unit, instead of the magnets. An inverted microscope system is described as an example in the embodiments. However, the present invention can be applied to an upright microscope system.

According to some embodiments, it is possible to operate the correction collar regardless of the up-and-down motion of the objective lens.

The first to fourth embodiments and the modified examples are merely examples to carry out the present invention. The present invention is not limited to the first to fourth embodiments and the modified examples. The present invention can be formed variously by appropriately combining the components disclosed in each of the embodiments and modified examples.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A microscope system comprising:
  a microscope including:
    one or more objective lenses each having at least an optical system configured to collect observation light from a specimen;
    a correction collar provided on each of the one or more objective lenses and configured to move the optical system in a direction of an optical axis of the optical system by rotating around each of the one or more objective lenses to correct aberration;
    a switching unit to which the one or more objective lenses are attachable and which is configured to switch positions of the one or more objective lenses;
    a supporting unit for supporting the switching unit; and
    a focusing unit that holds the supporting unit such that the supporting unit is movable along the optical axis of each of the one or more objective lenses; and
  a correction collar operating device detachably attached to the supporting unit and including:
    an input unit configured to input rotary force to rotate the correction collar;
    a correction collar driving unit configured to rotate the correction collar in response to the rotary force while the correction collar driving unit has contact with the correction collar; and
    a transmitting unit configured to transmit the rotary force input by the input unit to the correction collar driving unit,
  wherein the correction collar driving unit includes:
    two supporting shafts;
    a driving belt that is elastic and deformable and connects the two supporting shafts, and is configured to orbit freely around the two supporting shafts, wherein the two supporting shafts are located at an inner periphery of the driving belt, and an outer periphery of the driving belt between the two supporting shafts is configured to have contact with the correction collar; and a driving pulley that has contact with the driving belt and is configured to rotate by the rotary force transmitted by the transmitting unit.

2. The microscope system according to claim 1, wherein the correction collar operating device further includes:
a base having a flat plate shape; and
a rotary unit that is provided on a principal surface of the base so as to rotate with respect to the base, and
wherein the rotary unit supports the input unit, the transmitting unit, and the correction collar driving unit.

3. The microscope system according to claim 2, further comprising a positioning unit configured to position the base and the rotary unit.

4. The microscope system according to claim 1, wherein:
the input unit is rotatable and is configured to input the rotary force by rotation, and
a direction of the rotation of the input unit is identical to a direction in which the correction collar driving unit rotates the correction collar.

5. The microscope system according to claim 1, wherein the input unit of the correction collar operating device is configured to be manually rotated by a user.

6. The microscope system according to claim 1, wherein the transmitting unit includes:
two additional supporting shafts; and
another driving belt configured to orbit around the two additional supporting shafts, and
wherein the input unit is coupled to one of the two additional supporting shafts, and the driving pulley of the correction collar driving unit is coupled to the other of the two additional supporting shafts.

7. A microscope system comprising:
a microscope including:
one or more objective lenses each having at least an optical system configured to collect observation light from a specimen;
a correction collar provided on each of the one or more objective lenses and configured to move the optical system in a direction of an optical axis of the optical system by rotating around each of the one or more objective lenses to correct aberration;
a switching unit to which the one or more objective lenses are attachable and which is configured to switch positions of the one or more objective lenses;
a supporting unit for supporting the switching unit; and
a focusing unit that holds the supporting unit such that the supporting unit is movable along the optical axis of each of the one or more objective lenses; and
a correction collar operating device detachably attached to the microscope and including:
an input unit configured to input rotary force to rotate the correction collar;
a correction collar driving unit configured to follow motion of each of the one or more objective lenses while the correction collar driving unit has contact with the correction collar, and configured to rotate the correction collar in response to the rotary force while the correction collar driving unit has contact with the correction collar; and
a transmitting unit configured to transmit the rotary force input by the input unit to the correction collar driving unit,
wherein the correction collar driving unit includes:
two supporting shafts;
a driving belt that is elastic and deformable and connects the two supporting shafts, and is configured to orbit freely around the two supporting shafts,
wherein the two supporting shafts are located at an inner periphery of the driving belt, and an outer periphery of the driving belt between the two supporting shafts is configured to have contact with the correction collar; and
a driving pulley that has contact with the driving belt and is configured to rotate by the rotary force transmitted by the transmitting unit.

8. The microscope system according to claim 7, wherein the correction collar operating device further includes:
a base having a flat plate shape; and
a rotary unit that is provided on a principal surface of the base so as to rotate with respect to the base, and
wherein the rotary unit supports the input unit, the transmitting unit, and the correction collar driving unit.

9. The microscope system according to claim 8, further comprising a positioning unit configured to position the base and the rotary unit.

10. The microscope system according to claim 7, wherein:
the input unit is rotatable and is configured to input the rotary force by rotation,
and a direction of the rotation of the input unit is identical to a direction in which the correction collar driving unit rotates the correction collar.

11. The microscope system according to claim 7, wherein the correction collar driving unit of the correction collar operating device is configured to follow the motion of each of the one or more objective lenses of the microscope in the direction of the optical axis of the optical system, while the correction collar driving unit has contact with the correction collar.

12. The microscope system according to claim 7, wherein the input unit of the correction collar operating device is configured to be manually rotated by a user.

13. The microscope system according to claim 7, wherein the transmitting unit includes:
two additional supporting shafts; and
another driving belt configured to orbit around the two additional supporting shafts, and
wherein the input unit is coupled to one of the two additional supporting shafts, and the driving pulley of the correction collar driving unit is coupled to the other of the two additional supporting shafts.

14. A correction collar operating device configured to be detachably attached to a microscope, the microscope comprising: one or more objective lenses each having at least an optical system configured to collect observation light from a specimen; a correction collar provided on each of the one or more objective lenses and configured to move the optical system in a direction of an optical axis of the optical system by rotating around each of the one or more objective lenses to correct aberration; a switching unit to which the one or more objective lenses are attachable and which is configured to switch positions of the one or more objective lenses; a supporting unit for supporting the switching unit; and a focusing unit that holds the supporting unit such that the supporting unit is movable along the optical axis of each of the one or more objective lenses, the correction collar operating device being configured to be detachably attached to the supporting unit, and the correction collar operating device comprising:
an input unit configured to input rotary force to rotate the correction collar;
a correction collar driving unit configured to rotate the correction collar in response to the rotary force while the correction collar driving unit has contact with the correction collar; and a transmitting unit configured to transmit the rotary force input by the input unit to the correction collar driving unit, wherein the correction collar driving unit includes:
two supporting shafts;
a driving belt that is elastic and deformable and connects the two supporting shafts, and is configured to orbit freely around the two supporting shafts, wherein the two supporting shafts are located at an inner periphery of the driving belt, and an outer periphery of the driving belt between the two supporting shafts is configured to have contact with the correction collar; and
a driving pulley that has contact with the driving belt and is configured to rotate by the rotary force transmitted by the transmitting unit.

15. The correction collar operating device according to claim 14, wherein the input unit is configured to be manually rotated by a user.

16. The correction collar operating device according to claim 14, wherein the transmitting unit includes:
two additional supporting shafts; and
another driving belt configured to orbit around the two additional supporting shafts, and
wherein the input unit is coupled to one of the two additional supporting shafts, and the driving pulley of the correction collar driving unit is coupled to the other of the two additional supporting shafts.

17. A correction collar operating device configured to be detachably attached to a microscope, the microscope comprising: one or more objective lenses each having at least an optical system configured to collect observation light from a specimen; a correction collar provided on each of the one or more objective lenses and configured to move the optical system in a direction of an optical axis of the optical system by rotating around each of the one or more objective lenses to correct aberration; a switching unit to which the one or more objective lenses are attachable and which is configured to switch positions of the one or more objective lenses; a supporting unit for supporting the switching unit; and a focusing unit that holds the supporting unit such that the supporting unit is movable along the optical axis of each of the one or more objective lenses, the correction collar operating device comprising:

an input unit configured to input rotary force to rotate the correction collar;
a correction collar driving unit configured to rotate the correction collar in response to the rotary force while the correction collar driving unit has contact with the correction collar; and
a transmitting unit configured to transmit the rotary force input by the input unit to the correction collar driving unit, wherein the correction collar driving unit is configured to move in a direction orthogonal to a direction in which a load is applied to the correction collar, and wherein the correction collar driving unit includes:
two supporting shafts;
a driving belt that is elastic and deformable and connects the two supporting shafts, and is configured to orbit freely around the two supporting shafts, wherein the two supporting shafts are located at an inner periphery of the driving belt, and an outer periphery of the driving belt between the two supporting shafts is configured to have contact with the correction collar; and
a driving pulley that has contact with the driving belt and is configured to rotate by the rotary force transmitted by the transmitting unit.

18. The correction collar operating device according to claim 17, wherein the correction collar driving unit is configured to move in the direction of the optical axis of the optical system, which is said direction orthogonal to the direction in which the load is applied to the correction collar.

19. The correction collar operating device according to claim 17, wherein the input unit is configured to be manually rotated by a user.

20. The correction collar operating device according to claim 17, wherein the transmitting unit includes:
two additional supporting shafts; and
another driving belt configured to orbit around the two additional supporting shafts, and
wherein the input unit is coupled to one of the two additional supporting shafts, and the driving pulley of the correction collar driving unit is coupled to the other of the two additional supporting shafts.

* * * * *